(12) United States Patent
Wu et al.

(10) Patent No.: US 9,246,409 B2
(45) Date of Patent: Jan. 26, 2016

(54) METHOD AND APPARATUS FOR CONTROLLING LCL CONVERTERS USING ASYMMETRIC VOLTAGE CANCELLATION TECHNIQUES

(75) Inventors: Hunter Wu, Logan, UT (US); Kylee Devro Sealy, River Heights, UT (US); Bryan Thomas Sharp, Cottonwood Heights, UT (US); Aaron Gilchrist, Logan, UT (US)

(73) Assignee: UTAH STATE UNIVERSITY, North Logan, UT (US)

( * ) Notice: Subject to any disclaimer, the term of this patent is extended or adjusted under 35 U.S.C. 154(b) by 255 days.

(21) Appl. No.: 13/642,925

(22) PCT Filed: Mar. 12, 2012

(86) PCT No.: PCT/US2012/028829
§ 371 (c)(1),
(2), (4) Date: Oct. 23, 2012

(87) PCT Pub. No.: WO2012/125590
PCT Pub. Date: Sep. 20, 2012

(65) Prior Publication Data
US 2013/0039099 A1    Feb. 14, 2013

Related U.S. Application Data

(60) Provisional application No. 61/451,823, filed on Mar. 11, 2011.

(51) Int. Cl.
*H02J 1/02* (2006.01)
*H02M 7/5387* (2007.01)
(Continued)

(52) U.S. Cl.
CPC ............ *H02M 7/53871* (2013.01); *H02J 5/005* (2013.01); *H02M 2007/4815* (2013.01); *Y02B 70/1441* (2013.01)

(58) Field of Classification Search
CPC ........................... H02M 7/53871; H02J 5/005
USPC ............... 363/21.02, 39, 40, 44–46; 323/282, 323/283, 285
See application file for complete search history.

(56) References Cited

U.S. PATENT DOCUMENTS 4,661,897 A     4/1987 Pitel et al.
6,147,475 A  *  11/2000 Bridgeman ................... 323/211
(Continued)

FOREIGN PATENT DOCUMENTS

EP    1717940 A2    2/2006
FR    2738417 A1    3/1997
(Continued)

OTHER PUBLICATIONS

PCT/US2012/028829, International Search Report, Mar. 11, 2011.
(Continued)

*Primary Examiner* — Matthew Nguyen
(74) *Attorney, Agent, or Firm* — Kunzler Law Group

(57) ABSTRACT

A method and apparatus for LCL resonant converter control utilizing Asymmetric Voltage Cancellation is described. The methods to determine the optimal trajectory of the control variables are discussed. Practical implementations of sensing load parameters are included. Simple PI, PID and fuzzy logic controllers are included with AVC for achieving good transient response characteristics with output current regulation.

20 Claims, 48 Drawing Sheets

(51) Int. Cl.
*H02J 5/00* (2006.01)
*H02M 7/48* (2007.01)

(56) References Cited

U.S. PATENT DOCUMENTS

| | | | |
|---|---|---|---|
| 6,317,338 B1 | 11/2001 | Boys | |
| 6,366,051 B1 | 4/2002 | Nantz et al. | |
| 6,448,745 B1 | 9/2002 | Killat et al. | |
| 7,126,832 B2* | 10/2006 | Sasaki et al. | 363/44 |
| 7,148,669 B2 | 12/2006 | Maksimovic et al. | |
| 7,652,459 B2 | 1/2010 | Qahouq et al. | |
| 8,085,024 B2 | 12/2011 | Prodic et al. | |
| 8,553,434 B2* | 10/2013 | Coccia et al. | 363/40 |
| 2006/0181906 A1 | 8/2006 | Batarseh et al. | |
| 2008/0203992 A1 | 8/2008 | Qahouq et al. | |
| 2009/0174263 A1 | 7/2009 | Baarman et al. | |
| 2009/0267582 A1 | 10/2009 | Prodic et al. | |
| 2010/0109604 A1 | 5/2010 | Boys et al. | |
| 2011/0049978 A1 | 3/2011 | Sasaki et al. | |
| 2011/0163542 A1 | 7/2011 | Farkas | |
| 2011/0181240 A1 | 7/2011 | Baarman et al. | |
| 2011/0304216 A1 | 12/2011 | Baarman | |
| 2012/0049620 A1 | 3/2012 | Jansen | |
| 2013/0049484 A1 | 2/2013 | Weissentern et al. | |
| 2013/0106376 A1* | 5/2013 | Tseng et al. | 323/282 |
| 2013/0320943 A1* | 12/2013 | Meehan et al. | 323/282 |

FOREIGN PATENT DOCUMENTS

| | | |
|---|---|---|
| RU | 2412514 C2 | 2/2011 |
| TW | 200810315 A | 2/2008 |
| WO | 2012001291 A2 | 1/2012 |
| WO | 2012007942 A2 | 1/2012 |

OTHER PUBLICATIONS

Brooker et al., Technology improvement pathways to cost effective vehicle electrification, 2010 SAE2010 World Cong. 1-18 (Feb. 1, 2010).
Budhia et al., Design and Optimisation of Circular Magnetic Structures for Lumped Inductive Power Transfer Systems, 2009 Energy Conversion Cong. and Expo 2081-2088 (Sep. 20-24, 2009).
Magnus et al., A d.c. magnetic metamaterial, 7:4 Nat. Mater. 295-297 (2008).
Milton et al., Realizability of metamaterials with prescribed electric permittivity and magnetic permeability tensors, 12 New Journal of Physics (Mar. 2010).
Zierhofer et al., Geometric approach for coupling enhancement of magnetically coupled coils, 43 IEEE Transactions on Biomedical Engineering 708-714 (1996).
Boys et al., Stability and control for inductively coupled power transfer systems, 147 IEE Proc.—Electric Power Applications 37-43 (2000).
Wang et al., Design considerations for a contactless electric vehicle batter charger, 52 IEEE Transactions on Industrial Electronics 1308-1314 (2005).
Covic et al., A Three-Phase Inductive Power Transfer System for Roadway-Powered Vehicles, 54:6 IEEE Transactions on Industrial Applications 3370-3378 (2007).
Borage et al., Analysis and design of an LCL-T resonant converter as a constant-current power supply, 52 IEEE Transactions on Industrial Electronics 1547-1554 (2005).
Elliott et al., Multiphase Pickups for Large Lateral Tolerance Contactless Power-Transfer Systems, 57 IEEE Transactions on Industrial Electronics 1590-1598 (May 2010).
Nakao et al., Ferrite core couplers for inductive chargers, 2 Power Conversion Conf. 850-854 (2002).
Boys et al., Controlling inrush currents in inductively coupled power systems, 7 IEEE Int'l Power Engineering Conference 1046-1051 (2005).
Huang et al., LCL pick-up circulating current controller for inductive power transfer systems, 2010 IEEE Energy Conversion Cong. and Exposition (ECCE) 640-646 (Sep. 12-16, 2010).
Budhia et al., A new IPT magnetic coupler for electric vehicle charging systems 36 IEEE Industrial Electronics and Applications 2487-2492 (Nov. 7-10, 2010).
Si et al., Analyses of DC Inductance Used in ICPT Power Pick-Ups for Maximum Power Transfer, 2005 IEEE Transmission and Distribution Conf. and Exhibition: Asia and Pacific 1-6 (2005).
Xu et al., Modeling and controller design of ICPT pickups, 3 Int'l Conf. on Power System Technology 1602-1606 (2002).
Jin et al., Characterization of novel Inductive Power Transfer Systems for On-Line Electric Vehicles, 26 IEEE Applied Power Electronics Conference and Expo 1975-1979 (Mar. 6-11, 2011).
Nagatsuka et al., Compact contactless power transfer system for electric vehicles, 2010 Int'l Power Electronics Conf. 807-813 (Jun. 21-24, 2010).
Covic et al., Self tuning pick-ups for inductive power transfer, 2008 IEEE Power Electronics Specialists Conf. 3489-3494.
Si et al., Wireless Power Supply for Implantable Biomedical Device Based on Primary Input Voltage Regulation, 2 IEEE Cof. on Industrial Electronics and Applications 235-239 (2007).
Joung et al., An energy transmission system for an artificial heart using leakage inductance compensation of transcutaneous transformer, 13 IEEE Transactions on Power Electronics 1013-1022 (1998).
Si et al., A Frequency Control Method for Regulating Wireless Power to Implantable Devices, 2 IEEE Transactions on Biomedical Circuits and Systems 22-29 (2008).
Sasaki et al., Thermal and Structural Simulation Techniques for Estimating Fatigue of an IGBT Module, 20 Power Semiconductor Devices and IC's 181-184 (2008).
Ciappa et al., Lifetime prediction of IGBT modules for traction applications, 38 IEEE Reliability Physics Symp. 210-216 (2000).
Borage et al., Analysis and design of an LCL-T resonant converter as a constant-current power supply, 52 IEEE Int'l Electric Machines & Drives Conf. 1547-1554 (2005).
Budhia et al., A new IPT magnetic coupler for electric vehicle charging systems, 36 IEEE Industrial Electronics Conf. 2487-2492 (Nov. 10-17, 2010).
Keeling et al., A Unity-Power-Factor IPT Pickup for High-Power Applications, 57 IEEE Transactions on Industrial Electronics 744-751 (Feb. 2010).
Boys et al., Single-phase unity power-factor inductive power transfer system, 2008 IEEE Power Electronics Specialists Conf. 3701-3706.

* cited by examiner

| Starting State | Ending State | Switching Condition |
|---|---|---|
| S1a(Vab +,ib +) | S1b(Vab +,ib -) | Zero-Voltage Switching |
| | S2a(Vab 0,ib +) | Hard (acceptable) |
| S1b(Vab +,ib -) | S1a(Vab +,ib +) | Zero-Voltage Switching |
| | S2b(Vab 0,ib -) | Hard (diode reverse recovery) |
| S2a(Vab 0,ib +) | S2b(Vab 0,ib -) | Zero-Voltage Switching |
| | S3a(Vab -,ib +) | Hard (acceptable) |
| S2b(Vab 0,ib -) | S2a(Vab 0,ib +) | Zero-Voltage Switching |
| | S3b(Vab -,ib -) | Hard (diode reverse recovery) |
| S3a(Vab -,ib +) | S3b(Vab -,ib -) | Zero-Voltage Switching |
| | S4a(Vab 0,ib +) | Hard (diode reverse recovery) |
| S3b(Vab -,ib -) | S3a(Vab -,ib +) | Zero-Voltage Switching |
| | S4b(Vab 0,ib -) | Hard (acceptable) |
| S4a(Vab 0,ib +) | S4b(Vab 0,ib -) | Zero-Voltage Switching |
| | S1a(Vab +,ib +) | Hard (diode reverse recovery) |
| S4b(Vab 0,ib -) | S4a(Vab 0,ib +) | Zero-Voltage Switching |
| | S1b(Vab +,ib -) | Hard (acceptable) |

Fig. 4

| Component | Value |
|---|---|
| Lb | 18.93 uH |
| Cb | 1.1151 uF |
| L1 | 12.62 uH |
| C1 | 0.5575 uF |

Fig. 36

| Q-Value | % THD Max ADC/AVC | % THD Ave. ADC/AVC | ADC Applicable | % TDH Max SCV/AVC | % TDH Ave. SCV/AVC | SVC Applicable |
|---|---|---|---|---|---|---|
| 4 | 12.684 | 3.342 | Yes | 1.515 | 1.124 | No |
| 2 | 12.363 | 2.584 | Yes | 1.000 | 1.000 | No |
| 1.5 | 12.077 | 2.498 | Yes | 1.000 | 1.000 | No |

METHOD AND APPARATUS FOR CONTROLLING LCL CONVERTERS USING ASYMMETRIC VOLTAGE CANCELLATION TECHNIQUES

CROSS-REFERENCE TO RELATED APPLICATIONS

This application claims priority to U.S. Provisional Patent Application No. 61/451,823, filed Mar. 11, 2011.

GOVERNMENT SPONSORED RESEARCH

This invention was made with government support under contract DE-EE0003114 awarded by the Department of Energy. The government has certain rights in the invention.

TECHNICAL FIELD

The present disclosure relates to a method for improving the efficiency of inductive power transfer systems, and in particular, to controlling LCL resonant converters using asymmetric voltage cancellation techniques.

BACKGROUND

One method of realizing wireless power transfer is through a process known as Inductive Power Transfer (IPT) in which input power, in the form of electrical energy from a constant high frequency alternating current, is transformed into time varying magnetic fields according to Ampere's Law (FIG. 1). On the receiving end, the magnetic field is transformed into an induced voltage according to Faraday's Law, thus creating output power for the load. Wireless power transfer may enable electric vehicles to be continuously charged while stationary or in motion with no physical connection between the vehicle and the roadway. IPT systems may be broadly separated into three main categories, including the power supply, magnetic coupler and the pickup receiver.

DISCLOSURE OF THE INVENTION

A key to designing wireless power supplies is to convert the DC power to high frequency AC power with no or little loss and parasitic effect while keeping the cost and size low as well. In practice, zero loss is never achieved. Hence, the objective of designing power converters has been to obtain the highest possible conversion efficiency, while keeping cost, size, and parasitic effects like Electromagnetic Interference (EMI) to a minimum. Improving efficiency and reducing EMI of high-power Inductor Capacitor Inductor (LCL) resonant converters has become a significant undertaking in the area of wireless power transfer. Electrical efficiency issues are associated with conversion loss in the transmitter electronics.

With the rapid growth of the renewable energy sector, the concept of high efficiency systems is becoming more and more vital. Following this trend, being able to achieve ultra-high efficiencies is turning out to be a well-established concept. As such, modern power electronics has put key emphasis into highly efficient soft-switched converters.

MOSFET technology has grown rapidly over the past decade in their performance. These devices are used as the fundamental building block for many power electronic systems today. However, the body diode in such devices usually has very poor turn off characteristics causing huge diode reverse recovery losses especially reported in LCL converters. What is needed is a control strategy for LCL converters to improve efficiency. This includes optimal switching conditions to eliminate diode reverse recovery losses in LCL converters. Fast switching speeds and very low on state resistance of MOSFET's is needed to improve insulated gate bipolar transistor (IGBT) performance.

A new modulation technique using Asymmetric Voltage Cancellation (AVC) is disclosed for providing efficient control of high-power LCL resonant converters used in Inductive Power Transfer (IPT) systems. AVC control provides a way to avoid diode reverse recovery losses while achieving acceptable Total Harmonic Distortion (THD) and associated losses. Coupled with extra parasitic or external capacitance across the switches in the H-bridge, a fully soft switched Zero Voltage Switching (ZVS) fixed frequency resonant power converter is realized.

BRIEF DESCRIPTION OF THE DRAWINGS

FIG. 4 illustrates a table with various, exemplary switching transition states for H-bridge.

FIG. 36 illustrates a table of exemplary component values for an LCL resonant network.

FIG. 45 illustrates a table listing the total harmonic distortion improvements in an exemplary asymmetric voltage cancellation.

BEST MODE(S) FOR CARRYING OUT THE INVENTION

Figure 1:
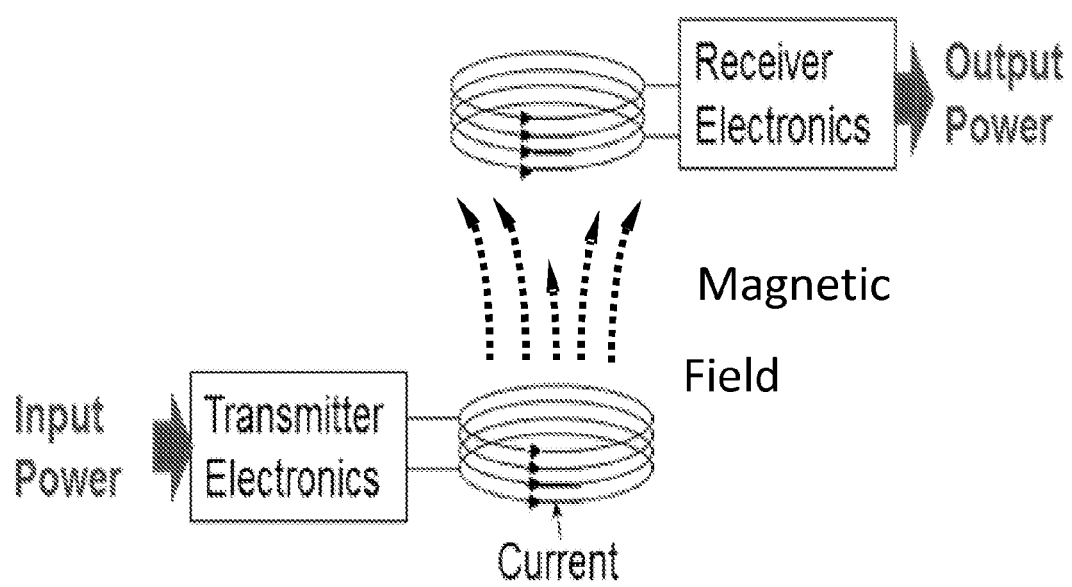
FIG. 1 illustrates an inductive power transfer system.

The present disclosure covers apparatuses and associated methods for an improved Inductor Capacitor Inductor (LCL) resonant converter. In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional" or "optionally" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

The present disclosure describes a method and apparatus for an improved Inductor Capacitor Inductor (LCL) resonant converter. An LCL network is tuned for resonance at a desired frequency. LCL networks operated at resonance act as a constant AC power source. An LCL converter is usually inefficient due to diode reverse recovery loss, which is associated with the reverse bias of the body diode while in the conduction state. This results in high switching losses. The converter efficiency is also related to the loading range in which a normal operating quality factor (Q1) values makes it impossible to avoid diode reverse recovery loss. Q1 can be defined by the equation below:

$$Q_1 = \frac{\omega L_1}{R_{r1}} \quad (1)$$

where $R_{r1}$ is the reflected track resistance, $\omega$ is the frequency in radians and $L_1$ is the track inductance. Existing control methods for LCL resonant converters include Symmetric Voltage Cancellation (SVC) and Asymmetric Duty Cycle (ADC) techniques. Both of these methods utilize a single control variable. The present disclosure introduces Asymmetric Voltage Cancellation (AVC), which takes advantage of three control variables for greater flexibility over SVC and ADC. This allows for control equivalent to SVC and ADC plus additional flexibility, thus by nature, AVC should be no less efficient than SVC and ADC for LCL resonant converter control. Other converters such as the full bridge series resonant converter have used AVC; however, the inventors are not aware of the application of AVC into LCL converters.

One problem in Inductive Power Transfer is Electromagnetic Interference (EMI). In this case, EMI is considered power radiated at an undesired frequency. This occurs when a signal is not perfectly sinusoidal and harmonics are introduced along with its fundamental frequency. Harmonics are sinusoidal signals at integer multiples of the fundamental frequency. This can be quantified by a well-known variable called Total Harmonic Distortion (THD), or the percentage of power contributed by the harmonics. For example, a 60 kHz operating frequency signal with a 9th harmonic (540 kHz) could interfere with AM radio.

Faraday's Law requires a changing magnetic field to induce an electromotive force. Similarly, by Ampere's Law, a changing current is required in order to create a changing magnetic field. Thus, a high frequency alternating current (AC) must be generated to transfer power through an inductive power transfer system. This means some converter or inverter must be used to convert direct current (DC) input into a desired AC output. One method for DC to AC conversion is the LCL resonant converter with full bridge control.

Figure 2:
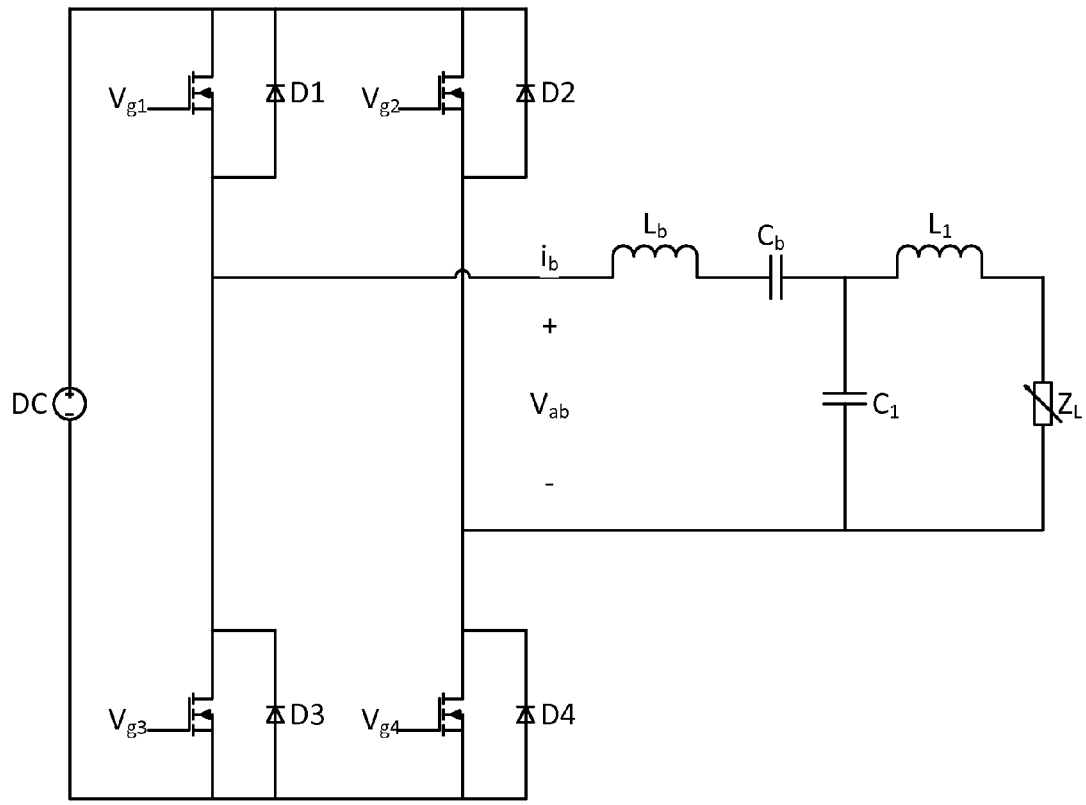
FIG. 2 illustrates an exemplary LCL resonant converter with full bridge control.

The LCL resonant converter, as shown in FIG. 2 is a well-known circuit that takes a DC input and produces a high frequency AC output. A desirable attribute of the LCL resonant converter is that when tuned and operated at its resonant frequency, the output current remains constant regardless of the load placed on it. This means the AC output current may be controlled without knowing the load, e.g. constant current source property. In addition, LCL converters have the advantages of high efficiency at light load (unity power factor) and harmonic filtering capabilities.

However, LCL resonant converters have a problem in their full-bridge control. The diodes in the full-bridge controller are prone to the high switching losses known as diode reverse recovery loss.

1. AVC Used in LCL Converters to Reduce Diode Reverse Recovery Losses

Figure 3:
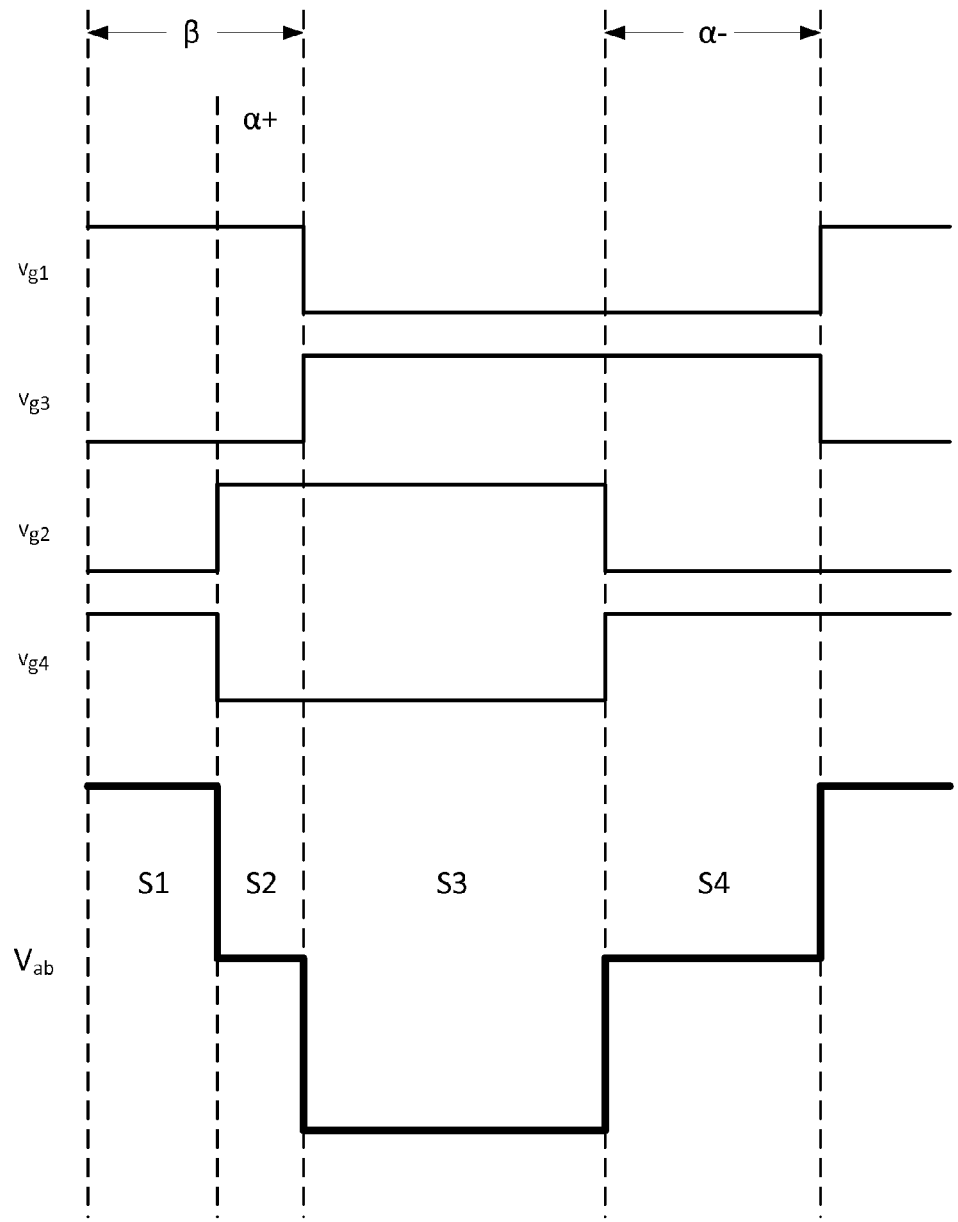
FIG. 3 illustrates a map of an exemplary switch gate waveform to H-bridge output voltage.

Diode reverse recovery loss occurs when a diode, which is forward biased, has an instantaneous voltage transition in the negative direction while current is still flowing through it. For example, the transition from state $S_1$ to state $S_2$ can be described with reference to FIGS. 2-4. If the current $i_b$ is negative in $S_1$, then the state is known as $S_{1b}$. The current is flowing up through $D_1$ and $D_4$, and $V_{ab}$ is positive. Since $V_{g1}$ is high, and $V_{g2}$ is low, there is no voltage across $D_4$ in the reverse direction. Once the circuit transitions to $S_{2b}$, $V_{g1}$ is high, and $V_{g2}$ is high, thus there is a high voltage across D4 in the reverse direction. Now, $D_4$ will transition to a non-conduction state as current starts flowing through the channel of the MOSFET associated with $V_{g2}$, but for a moment $D_4$ is conducting with a high reverse bias voltage. This phenomenon is called diode reverse recovery loss and the associated switching loss can be tens to hundreds of times of that in conduction losses for some components like power MOSFETs, which typically have particularly poor performance body diodes. This is due to the inherently poor characteristics of the body diode in the MOSFET during manufacturing. The current methods to avoid this problem are to place passive diode components (with excellent reverse recovery response) in parallel with the body diode, or to use ADC control. However, the former increases both the cost and size of the circuit and the later introduces increased harmonics into the waveform, hence increasing the THD.

Figure 5:
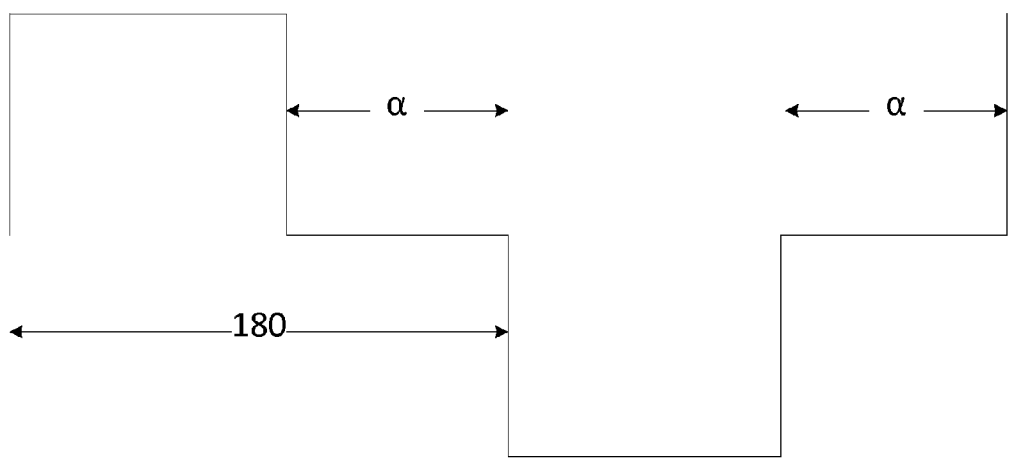
FIG. 5 illustrates an exemplary symmetric voltage cancellation control Vab waveform.

There are currently two conventional control methods used for LCL resonant converters. A first method used to control current is SVC control (see FIG. 5). This method has the advantages of being easy to implement, and has very good harmonic filtering capabilities when a conduction angle of 120° is used. SVC control is very easy to implement because it only uses one control variable, namely the conduction angle σ (180°-alpha). SVC control also provides low THD because a conduction angle at 120° eliminates all third harmonic components and the symmetry eliminates all even harmonics. However, there are drawbacks with SVC, as the aforementioned switching losses with body diodes are particularly high at σ=120°, even for relatively high Q1 (Q>5) conditions. The diode reverse recovery losses are directly inversely proportional to the operating quality factor (Q1) of the circuit.

Figure 6:
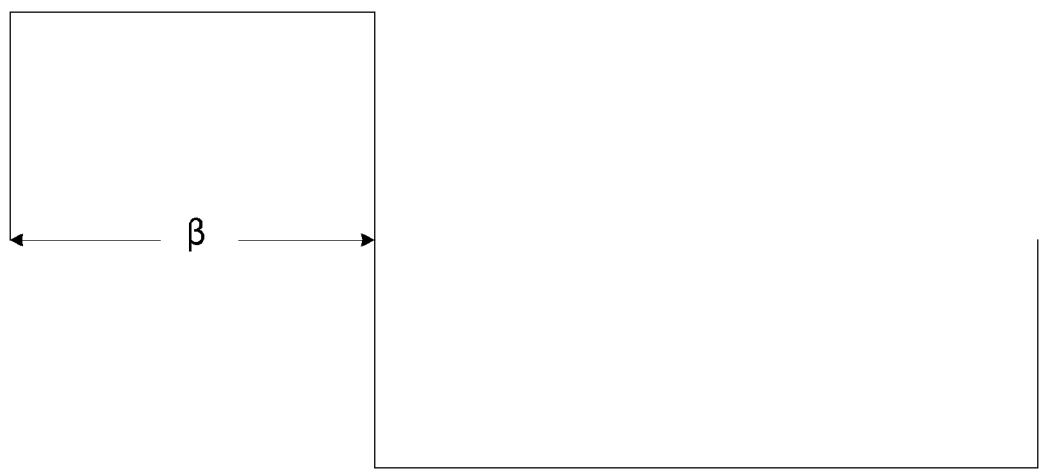
FIG. 6 illustrates an exemplary asymmetric duty cycle control Vab waveform.

A second method used to control LCL resonant converters is ADC control (see FIG. 6). This method has the advantages of being easy to implement and avoids diode reverse recovery loss above a certain quality factor. Like SVC, ADC only has one control variable, beta. However, it has much higher THD because of the asymmetric waveform.

Figure 7:
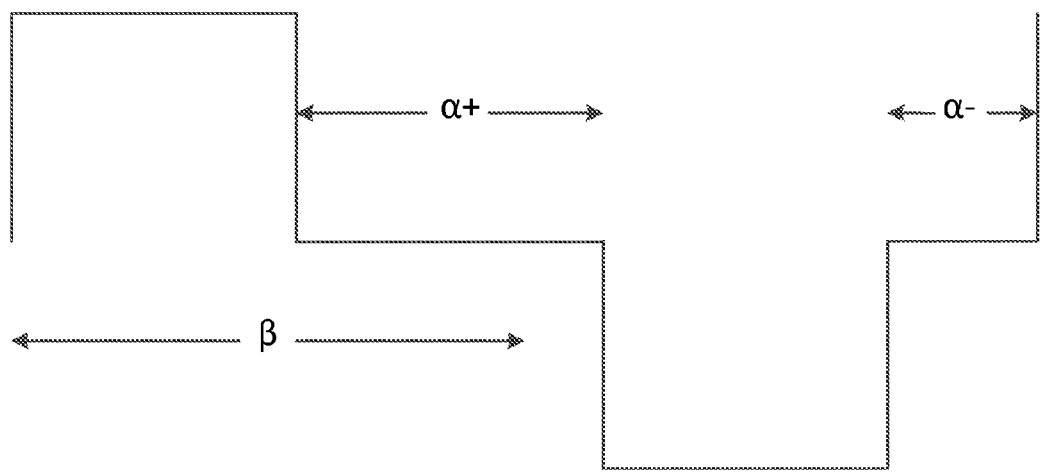
FIG. 7 illustrates an exemplary asymmetric voltage cancellation control Vab waveform.

In contrast to SVC and ADC control, AVC control provides a solution (see FIG. 7) that is able to control the AC input to the LCL resonant converter while reducing diode reverse recovery loss. AVC control uses three variables of control namely, alpha+, beta and alpha–. It has the potential to have the combined benefits of SVC and ADC by reducing THD and avoiding diode reverse recovery loss.

2. AVC to Optimize Performance of LCL Converters

AVC control is much more difficult to implement because of the three control variables involved. Additionally, to achieve the best results, the load condition (Q1) and gamma (Lb/L1) of the LCL resonant converter should be considered (discussed further in sections 3 and 4). In addition, the reflected reactive impedance from the secondary pickup also should be considered, as will be shown later, as not all reactive loading can be compensated passively, especially in systems that exhibit variable mutual coupling conditions. Variable mutual coupling systems in inductive power transfer systems have variable heights and alignments between transmitter and receiver coils. Examples of these systems include stationary EV charging systems where drivers cannot undertake perfect parking alignment positions and power transfer to vehicles in motion. Moreover, to keep LCL converters cost effective, the accuracy of tuning components in the network cannot be too high as the manufacturing cost is directly linked with the manufacturing tolerance of these tuning components. To keep the cost of converters reasonable, some tolerances in tuning must be allowed, and the AVC algorithm must either compensate for this variation by measurement through sensors or through robust design to operate over a wide range of mistuned conditions.

In summary, an optimal AVC control algorithm may find the trajectory for the three variables, alpha+, beta, alpha– that will satisfy the avoidance of diode reverse recovery loss, under different Q1, gamma (Lb/L1), reflected impedance, and component sensitivity issues. Unfortunately, the problem is extremely complicated as there are many combinations of alpha+, beta, and alpha– that may satisfy this condition and determining the optimal solution is not simple. Some basic guidelines that may govern the optimal solution are THD, switching losses (not diode reverse recovery losses), and conduction losses.

Here are a few approaches to solve the complex problem:

A steady-state time domain analysis approach may be used to solve for the solutions of AVC. This embodiment uses state-space representation in each switching state to solve for a single period waveform of $V_{ab}$, $i_b$, and $i_1$. A waveform solution using this approach has also been verified using SPICE modeling. For example, the LCL converter in FIG. 2 may be modeled by a set of piecewise linear state equations:

$$\dot{x}(t) = A \cdot x(t) + B \cdot V_d(t) \tag{2}$$

where x is the state vector, A is the system matrix, B is the input matrix, and $V_d$ is the input converter voltage.

$$x(t) = \begin{bmatrix} i_b(t) \\ V_b(t) \\ V_c(t) \\ i_1(t) \end{bmatrix} \quad A = \begin{bmatrix} 0 & -1/L_b & -1/L_b & 0 \\ 1/C_b & 0 & 0 & 0 \\ 1/C_1 & 0 & 0 & -1/C_1 \\ 0 & 0 & 1/L_1 & -R_L/L_1 \end{bmatrix} \quad B = \begin{bmatrix} 1/L_b \\ 0 \\ 0 \\ 0 \end{bmatrix} \tag{3}$$

It is possible to define the four time intervals, as $$\Delta_0 = t_1 - t_0$$
$$\Delta_1 = t_2 - t_1$$
$$\Delta_2 = t_3 - t_2$$
$$\Delta_3 = t_4 - t_3 \tag{4}$$

taking the four intervals into account:

$$V_d(\Delta_0) = V_{dc}, V_d(\Delta_1) = 0, V_d(\Delta_2) = -V_{dc}, V_d(\Delta_3) = 0 \tag{5}$$

The time domain solution of the state equations in the configuration k is $$x(t_{k+1}) = e^{A \cdot \Delta_k} x(t_k) + A^{-1}(e^{A \cdot \Delta_k} - I) B \cdot V_d(\Delta_k) \tag{6}$$

Four equations may be derived from (6) representing the time domain solutions for the four states, and combining the four equations into a simultaneous form provides the following matrix, $$\begin{bmatrix} -e^{A\cdot\Delta_0} & I & 0 & 0 \\ 0 & -e^{A\cdot\Delta_1} & I & 0 \\ 0 & 0 & -e^{A\cdot\Delta_z} & I \\ I & 0 & 0 & -e^{A\cdot\Delta_3} \end{bmatrix} \begin{bmatrix} x(t_0) \\ x(t_1) \\ x(t_2) \\ x(t_3) \end{bmatrix} = \begin{bmatrix} A^{-1}(e^{A\cdot\Delta_0} - I)B\cdot V_{dc} \\ 0 \\ -A^{-1}(e^{A\cdot\Delta_z} - I)B\cdot V_{dc} \\ 0 \end{bmatrix} \quad (7)$$

Solving (7) will give the state vector condition at each time interval. Substituting the state vector as initial conditions into (6) provides the full time domain solution.

The control variables Beta, Alpha+, and Alpha−, and the circuit characteristics Lb, Cb, L1, C1, and Zr, as shown in FIG. 2, are used in an algorithm. The algorithm is made to iterate through the possible combinations of Beta, Alpha+, and Alpha−, along with many Q1 values (loading conditions) and fills four matrices for i1, ib, total harmonic distortion of i1, and total harmonic distortion of ib. If the combination avoids diode reverse recovery loss then the corresponding points in the matrices are filled with the root-mean square i1, and ib values, and the total harmonic distortion values. Also, the switching current at all switching transitions and the conduction current for each state are saved.

Figure 8:
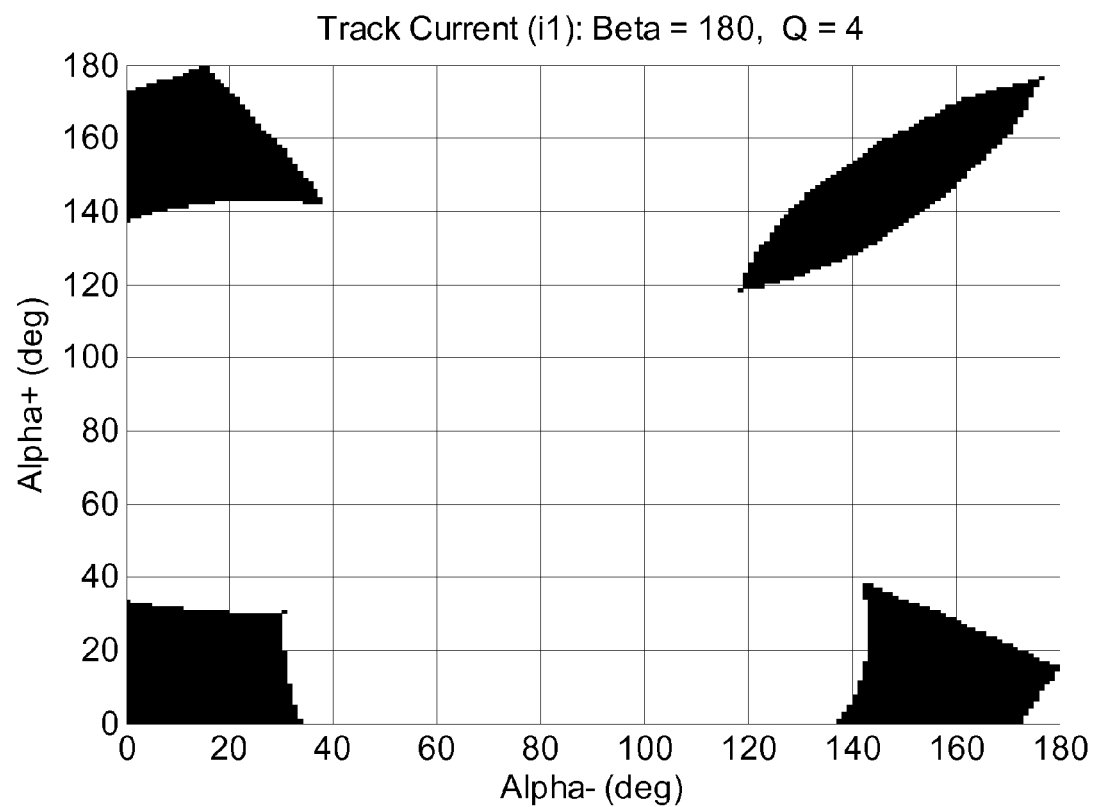
FIG. 8 illustrates the THD for different control angles, beta=180 and Q1=4.0.

The accumulated THD data may be displayed in an acceptability matrix, as shown in FIG. 8. The white regions where diode reverse recovery loss cannot be avoided are disregarded. Since this example was done for a beta value of 180°, the diagonal line (where alpha+=alpha−) correlates to SVC control. Additionally, the point where alpha+=alpha−=0 correlates to ADC control.

Figure 9:
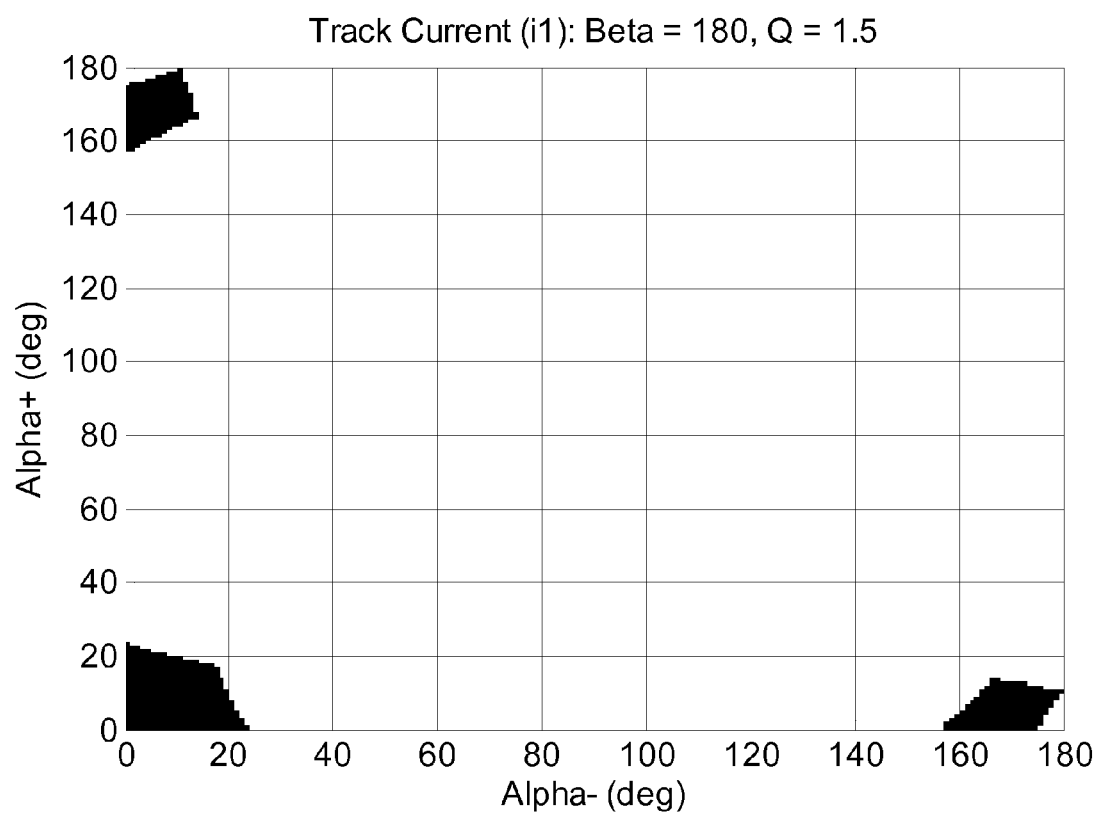
FIG. 9 illustrates the THD for different control angles, beta=180 and Q1=1.5.
Figure 10:
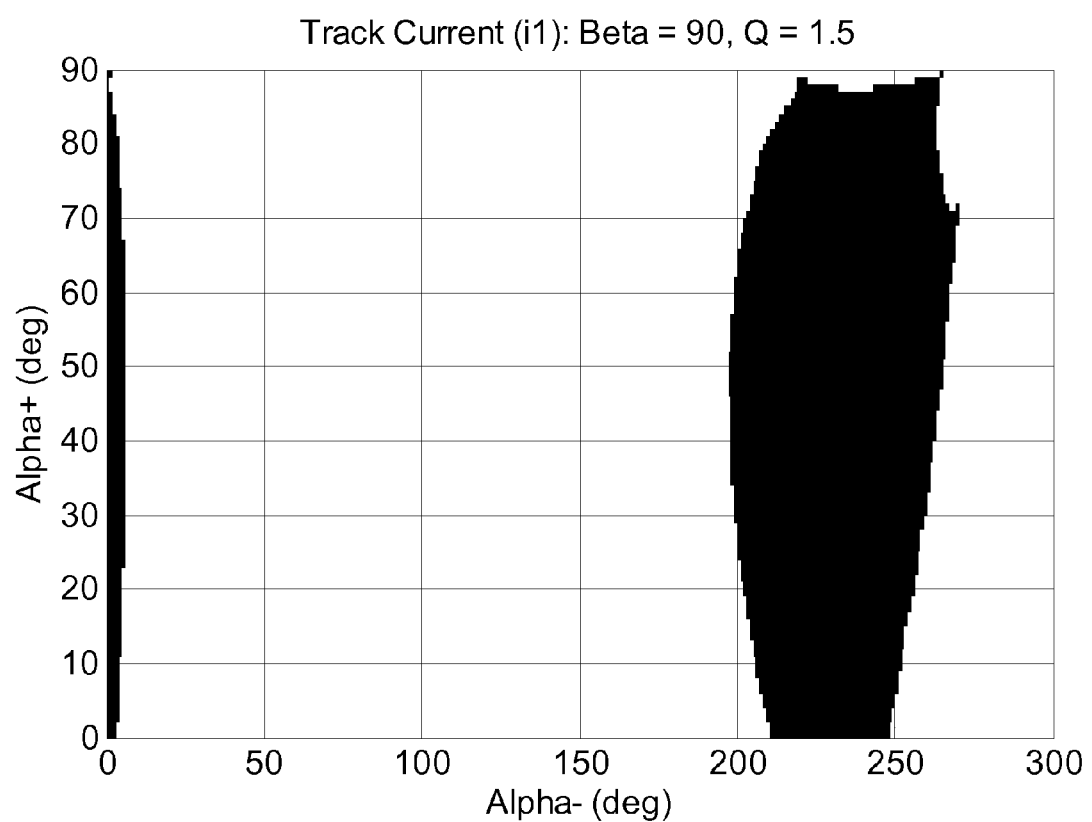
FIG. 10 illustrates the THD for different control angles, beta=90 and Q1=1.5.

Diode reverse recovery loss is impossible to avoid with SVC control if the current is controlled between approximately 6.2 A and 3.7 A, or a normalized current between 0.95 and 0.57. Diode reverse recovery loss becomes more difficult to avoid for lower Q1 values. FIG. 9 is an acceptability matrix, which may be compared to FIG. 8 to illustrate the effect of decreasing the Q1 value. The acceptability matrices clearly show that SVC control fails to avoid diode reverse recovery loss. Although a separate acceptability matrix is constructed for each different beta value, the evaluation of the acceptability matrices shows that ADC control avoids diode reverse recovery loss. FIG. 10 is another acceptability matrix, which may be compared to FIGS. 8 and 9 to illustrate the effect of changing beta.

In FIG. 10, the point at the origin corresponds to approximately 4.6 A, where the point at the origin in FIG. 9 corresponded to approximately 6.5 A. In both cases, diode reverse recovery loss is avoided. Hence, using ADC control, current has been controlled down to 72% of its maximum value while avoiding diode reverse recovery loss. This corresponds to a power transfer reduction in the system of 48.2% as there is a squared relationship between current and power. However, a terrible price has been paid in terms of THD for I1, and its value is as high as 10%. This is where AVC is proposed to provide reasonable THD, while avoiding diode reverse recovery loss.

In one embodiment, the hardware was designed for a maximum primary track current ($i_1$) of 6.57 A RMS, and a ratio $L_b/L_1$ of 1.5 as shown in FIG. 36. To design an LCL converter, the required $X_1$ is determined first, $$X_1 = \frac{2\sqrt{2}\,V_{dc}}{\pi(I_1)_{max}} \quad (8)$$

where $V_{dc}$ is the input DC voltage to the H-bridge.

Using $X_1$, the inductance and capacitance values can be determined using, $$X_1 = \frac{1}{\omega C_1} = \omega L_1 = \frac{\omega L_b}{\gamma} = \frac{1}{\omega C_b(\gamma - 1)} \quad (9)$$

Figure 11:
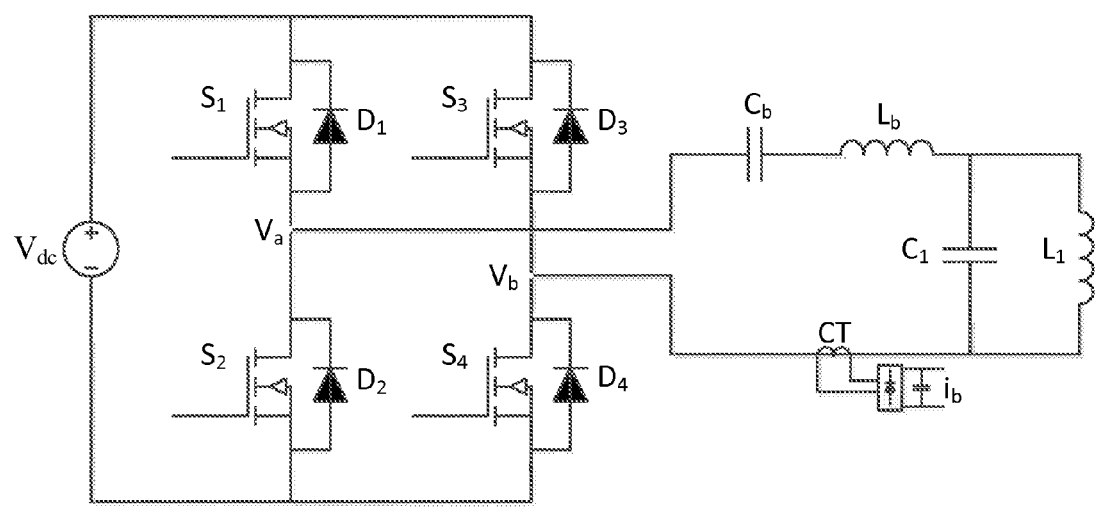
FIG. 11 illustrates an exemplary LCL converter using a Current Transformer (CT) to detect bridge current.

In this equation gamma is a ratio whereby $\gamma=(L_b/L_1)$ determines the size of $C_b$, which has a significant effect on the regions over which diode reverse recovery loss is avoided. Thus, gamma is an important parameter in the design of a system in which diode reverse recovery loss is avoided. The smaller the ratio $L_b/L_1$, the larger the regions over which diode reverse recovery loss may be avoided. However, the minimum ratio that may be obtained is 1 as $C_b$ cannot be larger than infinity. A ratio of 1.5 is large enough to keep the circuit realizable (with acceptable value of $C_b$), and small enough to give usable regions for diode reverse recovery avoidance. FIG. 11 shows a listing of values that may be used. The inductors are custom tuned to obtain desired values, and the capacitors are in banks giving the flexibility to fine tune.

Once all these waveforms and data have been computed, an optimal trajectory that avoids diode reverse recovery loss at the particular Q, gamma, reflected impedance and component tolerance may be determined based on the lowest weighting index calculated from THD, switching loss and conduction loss. The optimal trajectory should be control angles that will regulate the output current from a maximum designed value down to a certain predetermined amount. However, the number of points that may still satisfy this condition is very large and mapping out the optimal trajectory is difficult.

$$P_{weighting} = a_0 \cdot THD + a_1 \cdot P_{switching\,loss} + a_2 \cdot P_{conduction\,loss} \quad (10)$$

3. Optimal Trajectory Via Analytic Solutions

One approach to determine the optimal trajectory is via analytical function formulation. This approach is an expansion on the frequency domain spectral analysis. Here, some of the analytic techniques including graphical, calculus and optimization methods are used to solve the optimal trajectory. To carry out the frequency analysis, full frequency decomposition is used. The frequency decomposition consists of two stages, the input voltage generated by the AVC control algorithm and the frequency response of the LCL resonant network. The amplitude of the frequency components for the primary track current is:

$$I_1(n) = V_{ab}(n) \cdot Y_{V1}(n\omega_0) \quad (11)$$

where n is the $n^{th}$ harmonic component, $Y_{V1}$ is the admittance of the primary track current to the input voltage of the network, and $\omega_0$ is the fundamental resonant angular frequency.

Similarly, the bridge current is:

$$I_b(n) = V_{ab}(n) \cdot Y_{Vb}(n\omega_0) \quad (12)$$

where $Y_{Vb}$ is the admittance of the bridge current to the input voltage of the network. The computation of both variables is quite complex and each has both amplitude and phase components that must be considered.

For $V_{ab}$ the amplitude and phase components are:

$$|V_{ab}(n)| = \frac{V_{dc}}{n\pi} \cdot \sqrt{4 \cdot 2\cos(n\alpha_+) - 2\cos(n\beta) + 2\cos(n\alpha_-) - 2\cos(n(\beta+\alpha_-)) - 2\cos(n(\beta-\alpha_+)) - 2\cos(n(\beta-\alpha_++\alpha_-))} \quad (13)$$

$$\arg(V_{ab}(n)) = \tan^{-1}\frac{\sin(n(\beta-\alpha_+)) + \sin(n\beta) + \sin(n\alpha_-)}{1 - \cos(n(\beta-\alpha_-)) - \cos(n\beta) + \cos(n\alpha_+)} \quad (14)$$

Figure 12:
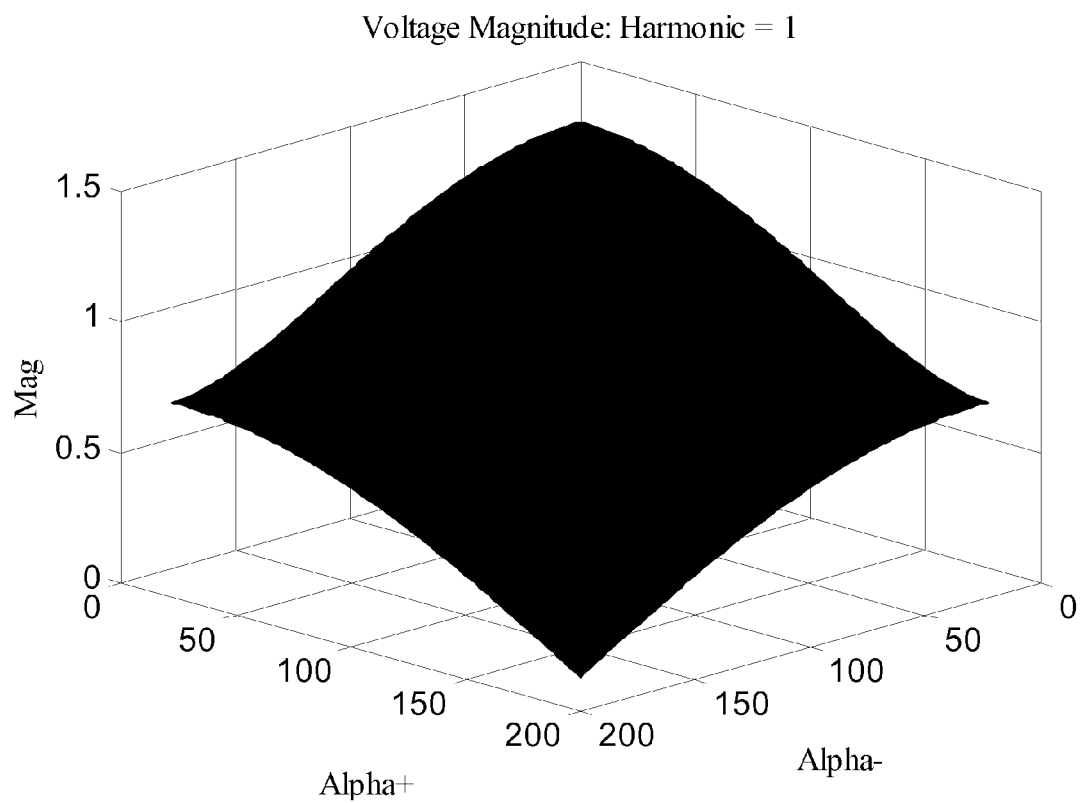
FIG. 12 illustrates an exemplary amplitude component plot of $V_{ab}$ for beta=180.
Figure 13:
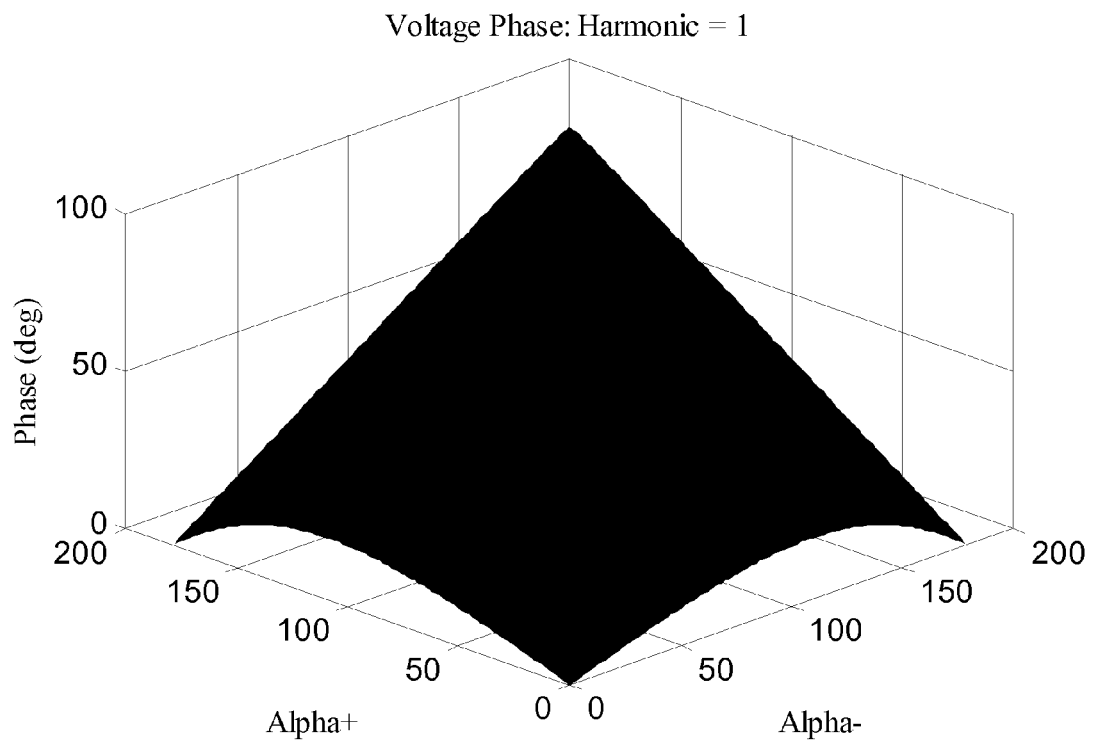
FIG. 13 illustrates an exemplary phase component plot of $V_{ab}$ for beta=180.
Figure 14:
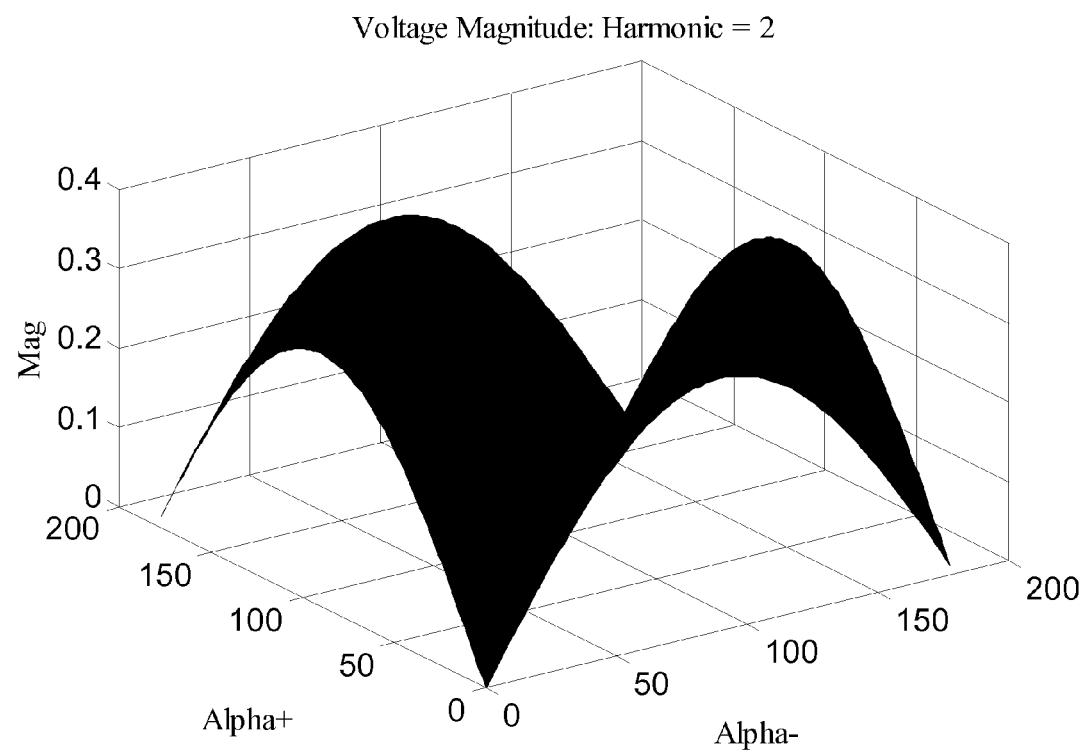
FIG. 14 illustrates an exemplary amplitude component plot of a second harmonic of $V_{ab}$ for beta=180.
Figure 15:
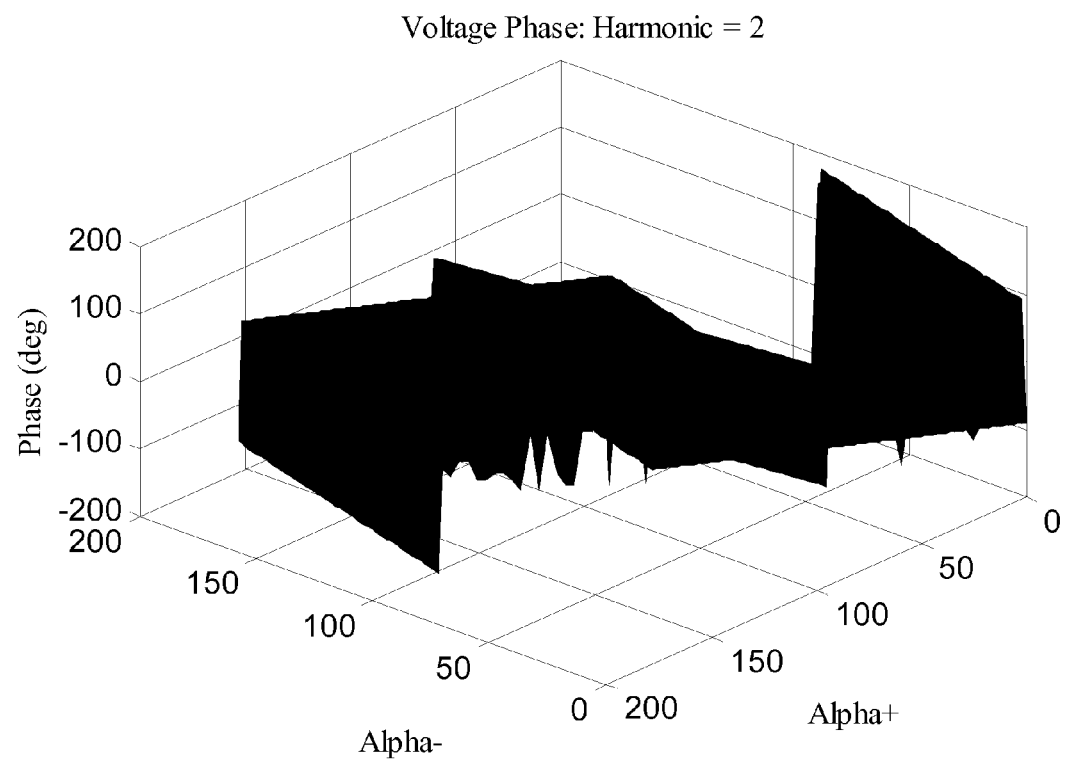
FIG. 15 illustrates an exemplary phase component plot of a second harmonic of $V_{ab}$ for beta=180.

The equations for both amplitude and phase are difficult to analytically predict using direct calculus methods of differentiation and integration. Hence, analytic simplification methods are used before using direct calculus methods. Here, a graphical based approach may be used first to determine the characteristics of the function before using analytical calculus techniques. FIGS. 12 and 13 show the fundamental amplitude and phase component of the $V_{ab}$, respectively. In addition, the second harmonic component amplitude and phase component are shown in FIGS. 14 and 15, respectively. Other harmonic components may also be analyzed but not shown here. Plots for other β angles should also need be analyzed, but are not shown here.

The admittance of the circuit may be determined for the LCL network. Two admittances, including the primary track and bridge are considered. The bridge admittance determines whether diode reverse recovery losses are eliminated and the primary track admittance determines the fundamental current and the THD in the track current. Firstly, the bridge admittance is analyzed. For an LCL network with a certain ratio of gamma, the impedance of the network is:

$$Z_{in}(\omega) = R_{in}(\omega) + jX_{in}(\omega) \quad (15)$$

$$R_{in}(\omega) = R_1\left(\frac{1}{(1-\omega_n^2)^2 + (\omega_n/Q_1)^2}\right) \quad (16)$$

$$X_{in}(\omega) = j\omega_0 L_1\left(\omega_n\gamma - \frac{\gamma-1}{\omega_n} + \frac{\omega_n - \omega_n^3 + (\omega_n/Q_1^2)}{(1-\omega_n^2)^2 + (\omega_n/Q_1)^2}\right) \quad (17)$$

where $\omega_n$ is the normalized frequency and $\omega_0$ is the fundamental frequency.

For the fundamental resistance, it can be simplified to:

$$R_{in}(\omega_0) = Q_1 X_1 \quad (18)$$

The higher harmonic resistances are substantially lower than the fundamental and reactive impedances, and they will be ignored in the preceding analysis.

For input reactance $X_{in}$, the two later terms are comparatively close to zero at higher harmonics than compared to the first term, and the amplitude of the equation is dominated by the first term. The second harmonic can be approximated by:

$$Z_{in}(2\omega_0) = j\omega_0 L_1(2\gamma - 0.5) \quad (19)$$

For harmonics beyond the second, it can be approximated by:

$$Z_{in}(n\omega_0) = j\omega_0 L_1 n\gamma \quad (20)$$

It should be noted here that, an important method to avoid diode reverse recovery is to introduce higher order harmonics into the bridge current waveform, because the fundamental in-phase component usually cannot avoid diode reverse recovery. Hence, this harmonic analysis is an important step that should not normally be ignored.

One question that arises is, how many harmonics need to be retained to determine the bridge current accurately? The impedance accuracy is found to be proportional to the ratio of the real current and reactive current as the reactive current into the bridge is 90° out of phase. Hence, $$e_z \propto \frac{X_{in}(n\omega_0)}{R_{in}(\omega_0)} = \frac{n\gamma}{Q_1} \quad (21)$$

The current accuracy is:

$$\text{accuracy}_{lb} \propto \frac{1/V_{ab}(n\omega)}{1/e_z} \propto \frac{\gamma n^2}{Q_1} > \text{factor} \quad (22)$$

Figure 16:
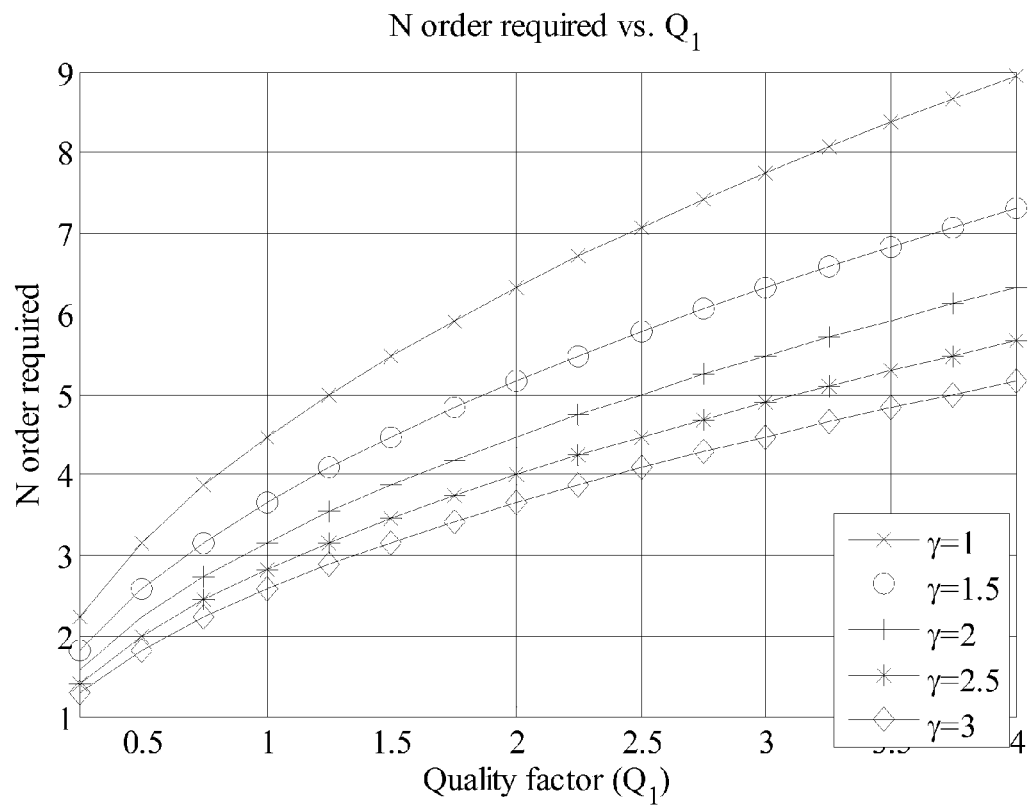
FIG. 16 illustrates the relation of the N order as a function of quality factor.

Using this equation, the nth harmonic required to analyze the circuit for an accuracy factor=10 is shown in FIG. 16. It was found by the inventors for typical operating conditions for one embodiment, when γ=1.5 and $Q_1$=4, an N order of approximately 7 is required, although this varies for different operating conditions. $Q_1$ of 4 is used because achieving diode reverse recovery losses may be avoided above $Q_1$=4 and should not need to be analyzed.

After the order is determined, the impedance and voltage input for the LCL converter may be determined together. This may be achieved by using the inductance to approximate the impedance of the network with the complex part being the input voltage amplitude and phase components. By determining certain ratios of the amplitude and phase of the input voltage, diode reverse recovery losses may be avoided. Using these, THD in the primary track current may be determined by the admittance of the primary track.

It may be summarized that there are two problems solved here. The first is whether diode reverse recovery losses is avoided. The second computation takes the points that avoid reverse recovery loss and computes the trend with optimum THD for operation.

Figure 17:
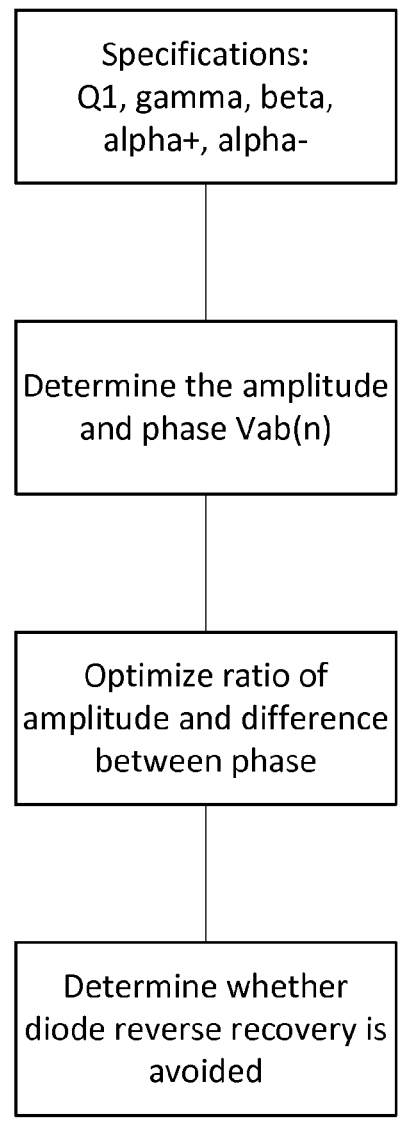
FIG. 17 illustrates an exemplary flowchart for determining diode reverse recovery loss.

An illustrational flowchart is shown in FIG. 17 for the computation of reverse recovery loss avoidance. The routine starts by using the system parameters to determine the frequency components. Then a routine to determine the optimum ratio for the amplitude component is used to predict the diode reverse recovery condition over a wide range of beta, alpha+, and alpha– angle conditions. After the optimum trend is determined, the results of a set of control angles are the output of the computation routine.

After the trends for avoiding diode reverse recovery losses are determined, the solutions then become the input for a second computation routine that determines the optimum trend of control in terms of THD values. These routines do not necessarily have to take the two-stage chronological order computation. An iterative process of calculating backwards and forwards between the two stages has shown to produce more optimum results.

4. Optimal Trajectory Via Algorithms to Solve the TSP

Due to the nature of control limits, the maximum jump size of the control angles alpha+, alpha−, and beta must be constrained to a bound for adjacent normalized track currents. By introducing this bound, the optimum THD path becomes difficult to determine as the lowest THD at a local point may offset higher overall THD through a trajectory. This particular type of problem may be quantified as a Travelling Salesperson Problem (TSP). The TSP is a well-known, extremely complex problem in mathematics and computer science. With roughly 100 steps or traveling nodes, the possibility to calculate this problem in a brute force manner is practically infeasible requiring over $6*10^{169}$ comparisons. Hence, algorithms that significantly reduce computation time to determine a near optimal AVC solution are implemented without guaranteeing the absolute optimal solution. The solution computed is usually very close to the optimal for AVC. Here, a greedy sales person algorithm may be used to determine the near optimal trajectory while minimizing computation resources. Many other algorithm options to solve the TSP may also be used. Described below are some of the possible variations of the TSP algorithms, which may be used to solve for an optimal trajectory for AVC control of LCL converters.

Figure 18:
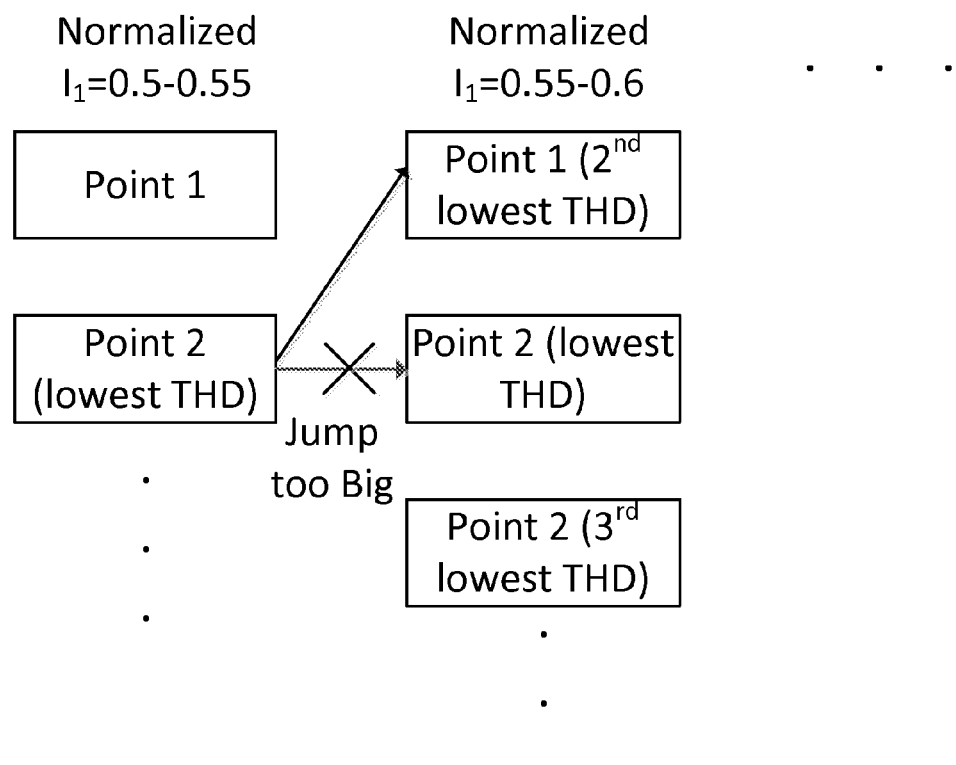
FIG. 18 illustrates an exemplary schematic of the Greedy salesperson algorithm.
Figure 19:
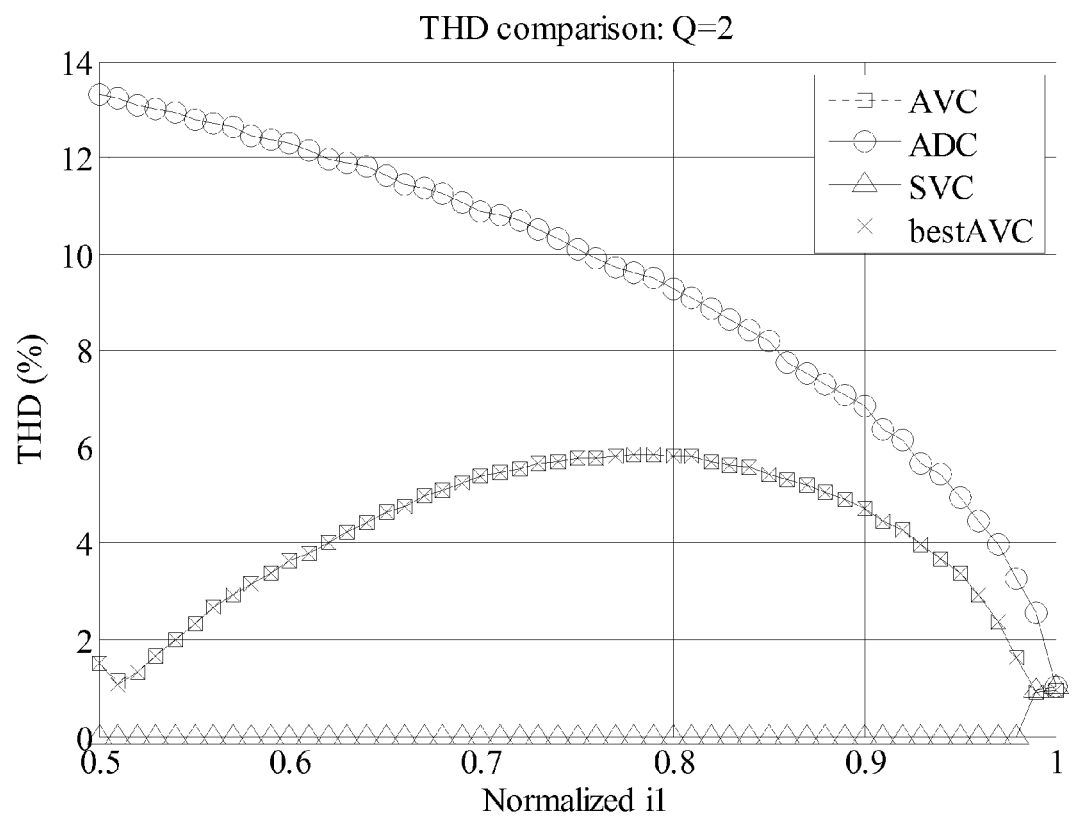
FIG. 19 illustrates an exemplary solution of the Greedy salesperson algorithm for $Q_1$=2.
Figure 20:
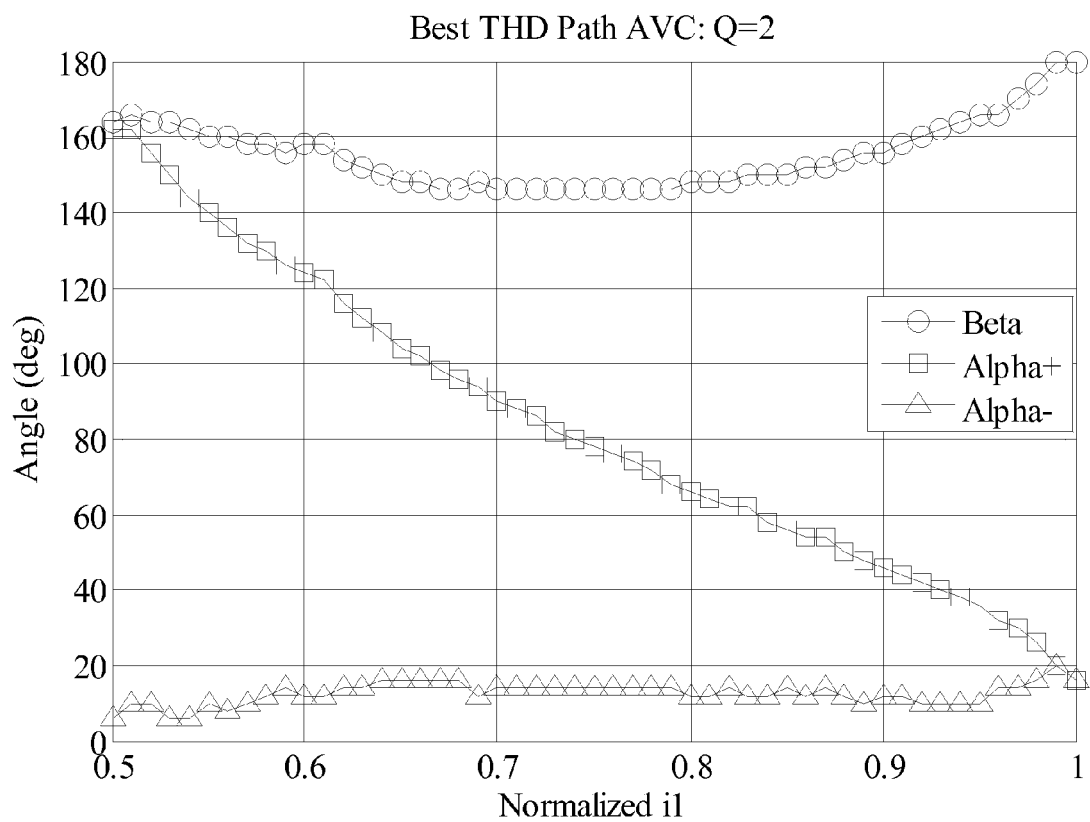
FIG. 20 illustrates an exemplary solution of the Greedy salesperson algorithm for control angles for THD for $Q_1$=2.
Figure 21:
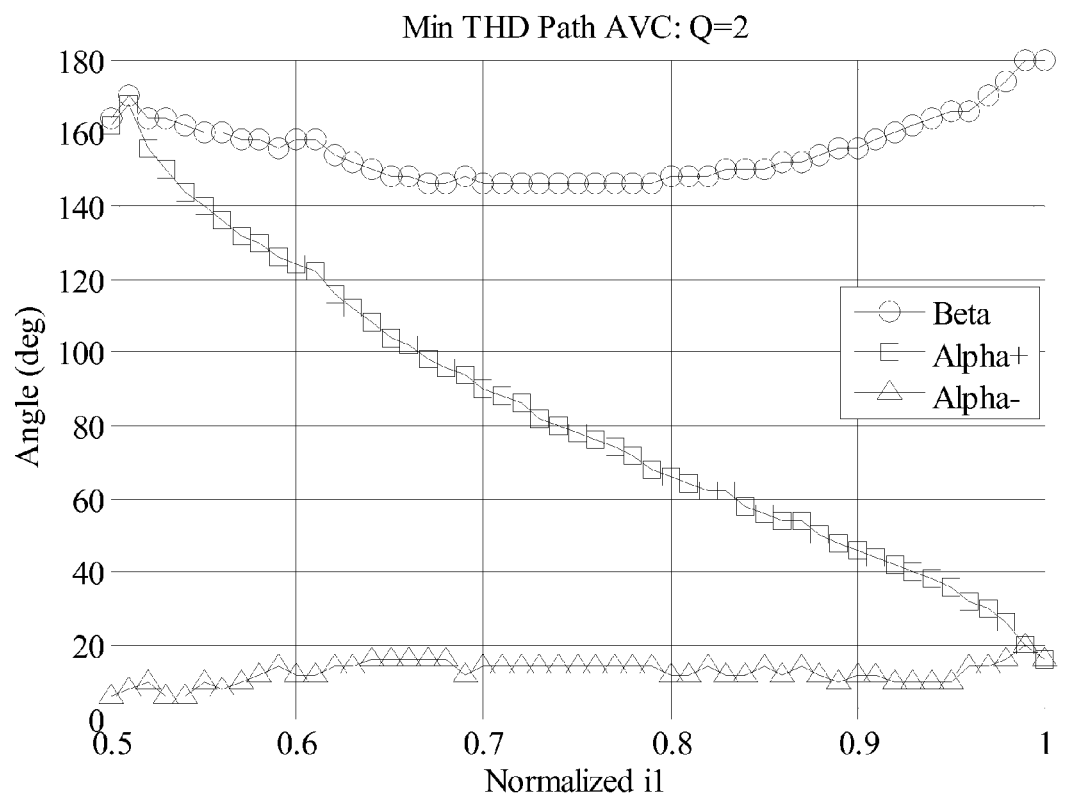
FIG. 21 illustrates an exemplary solution of the Greedy sales person algorithm for optimal THD for $Q_1$=2.
Figure 22:
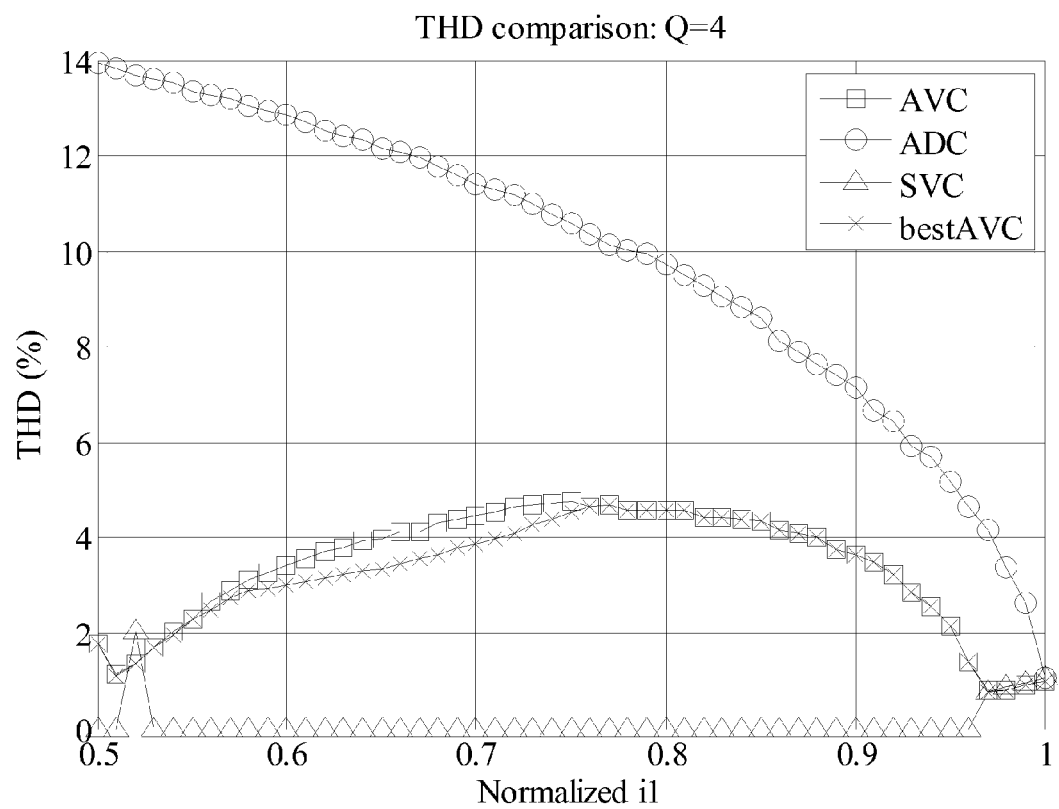
FIG. 22 illustrates an exemplary solution of the Greedy salesperson algorithm for $Q_1$=4.
Figure 23:
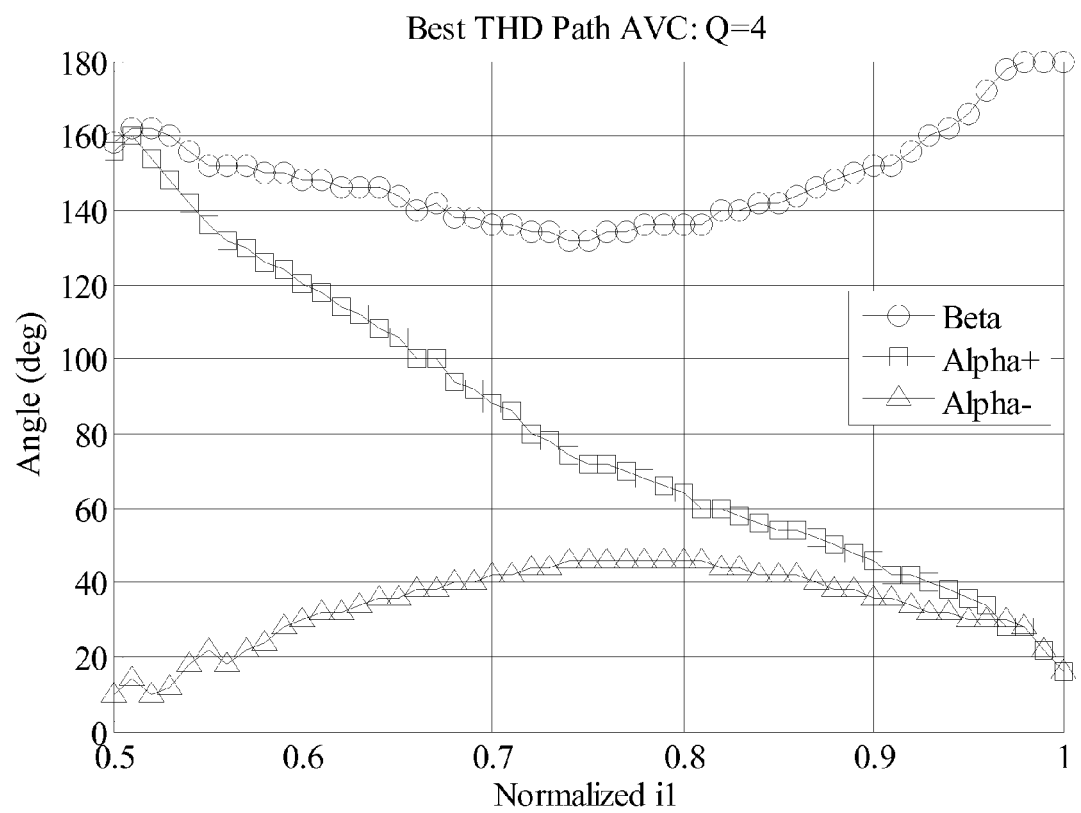
FIG. 23 illustrates an exemplary solution of the Greedy sales person algorithm for control angles for THD for $Q_1$=4.
Figure 24:
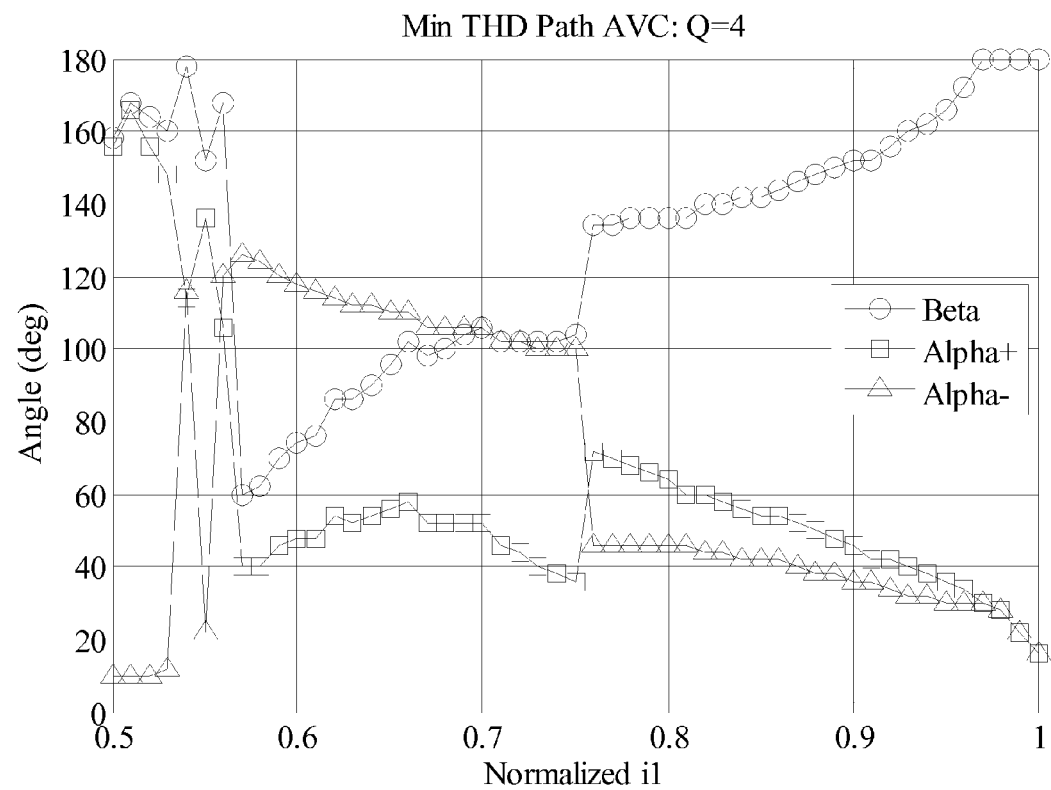
FIG. 24 illustrates an exemplary solution of the Greedy sales person algorithm with a minimum THD path.

A greedy salesman algorithm example is shown in FIG. 18. The algorithm starts at the normalized current range of $I_1=0.5$-$0.55$ and the lowest THD point is determined from the data set. The algorithm then starts to look at the points in the closest neighbors ($I_1=0.55$-$0.6$) and determines the lowest THD point that satisfies the constraint of a certain maximum jump angle (6 degrees in a particular case). In this case, the lowest THD point of the set of data is not selected because the jump angle is too large. This process is repeated until a complete trajectory from $I_1=0.5$ to $I_1=1$ is mapped out. The algorithm will use the second best THD point at the start to initiate the process again, to determine if there is another optimal trajectory that may be found. This may be repeated for N number of times, for the example of $Q_1=2$, only one iteration is required. FIG. 19 shows the determined trajectory for AVC using the greedy salesperson algorithm. In FIG. 19, "bestAVC" is superimposed on top of AVC. An extra plot of the absolute optimum is also added for comparison purposes. Note that this is equivalent to solving the TSP and finding the best possible solution. The best possible solution in some situations may never be achieved due to the jump angle constraints, even if all the possible options are computed using brute force methods. It can be seen that the optimum without any jump angle constraint is nearly the same as the simple greedy salesperson algorithm solution. The required alpha+, alpha−, and beta angles for the greedy salesperson solution, and the absolute optimal solution without jump angle constraint, are plotted in FIGS. 20 and 21. It can be seen that the computed angles are nearly the same and in this case, the greedy salesperson algorithm is more than sufficient to obtain the most optimal solution. A similar computation was carried out for $Q_1=4$ and the results are shown in FIG. 22. In this case, the best solution differed slightly from the greedy salesperson solution. This does not necessarily mean that the greedy salesperson algorithm is not the optimal, but it may not be as good as the best if jump angles are not constrained. The difference between the jump angles for the two is shown in FIGS. 23 and 24.

Figure 25:
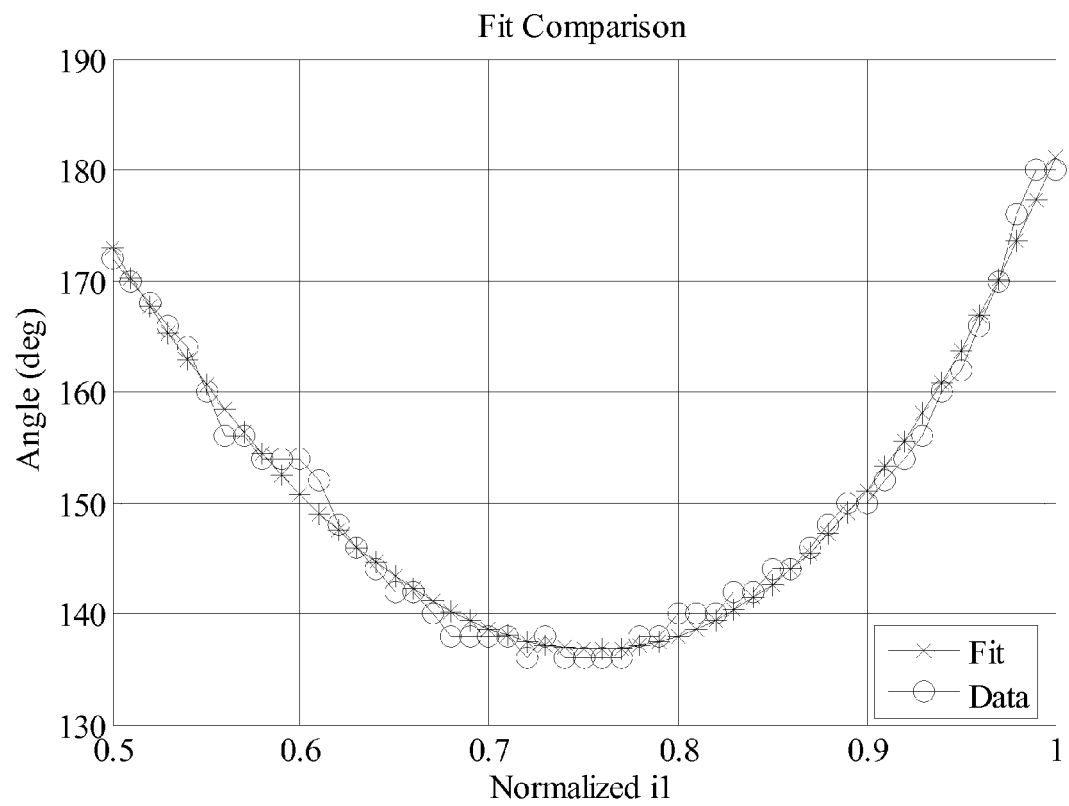
FIG. 25 illustrates the 4th order polynomial fitting for beta angle.

After the desired trajectory is determined, the physical realization of this may be completed using a lookup table stored in a microcontroller. However, this may require many points for different operating conditions of $Q_1$. One method of reducing the number of points is using polynomial approximation by least squares fitting. A curve fitting example is shown in FIG. 25. Here, a fourth order polynomial is used to estimate the beta angle and it can be seen that the approximation is very accurate.

A method to determine the optimal trajectory is described below. Here, a $4^{th}$ order least squares polynomial is used as an example. Only variable $I_1$ is included in the approximation and all other variables are considered as constants and inherently incorporated into the approximation. To approximate the normalized characteristics described above, the approximation function is in the form of:

$$f(\alpha_+,\alpha_-,\beta)=a_4I_1^4+a_3I_1^3+a_2I_1^2+a_1I_1+a_0 \qquad (23)$$

And the values to the polynomial may be obtained from:

$$A = \begin{bmatrix} a_4 \\ a_3 \\ a_2 \\ a_1 \\ a_0 \end{bmatrix} = (X^TX)^{-1}X^TY \qquad (24)$$

where X is the data matrix for the alpha+, alpha−, and beta. Y is the data matrix for the normalised output data of concern such as the normalised primary track current in this case. Because X matrix is most likely not square, a direct matrix inversion is not possible. Therefore, a pseudo-inverse process is usually required where the transpose of matrix X must be added to convert it into a square matrix so that matrix inversion can take place.

Multi-variable regression methods using one polynomial to include two or more operating parameters is also an option. As an example, the least squares fit polynomial on the above problem using multi-variable regression is:

$$f(\alpha_+,\alpha_-,\beta)=a_3I_1^3+a_2I_1^2+a_1I_1+a_0+b_3Q_1^3+b_2Q_1^2+ \\ b_1Q_1+c_2Q_1^2I_1+c_1I_1^2Q_1+d_1I_1Q_1 \qquad (25)$$

In this example, third order surface approximation is given. The coefficients of the polynomials are calculated using the similar process of the pseudo matrix inverse process in (24). Note the number of coefficients in the polynomial increases dramatically for surface approximations as the combinations of the order for the polynomial must also be included.

5. Sensing Circuits for AVC

The sensing circuit may be used to measure the loading condition ($Q_1$) and reflected reactive impedance and component tolerances. To measure the $Q_1$ of the circuit, a simple rectifier with a current transformer measuring the bridge current is used, as shown in FIG. 11. The rms bridge current is approximately related to:

$$i_b = \frac{V_{ab}R_{r1}}{X_1^2} \qquad (26)$$

where $V_{ab}$ is AC input voltage to the LCL network, $R_{r1}$ is the reflected resistance of the secondary pickup and $X_1(=\omega L_1)$ is the reactance of the LCL network. This equation assumes no reflected reactance. Since $X_1$ is a design value and $V_{ab}$ is a controller input, both variables are known and $R_{r1}$ is directly estimated by measuring $i_b$. The relationship of $R_{r1}$ to $Q_1$ is defined in (1) as $Q_1=\omega L_1/R_{r1}$.

Figure 26:
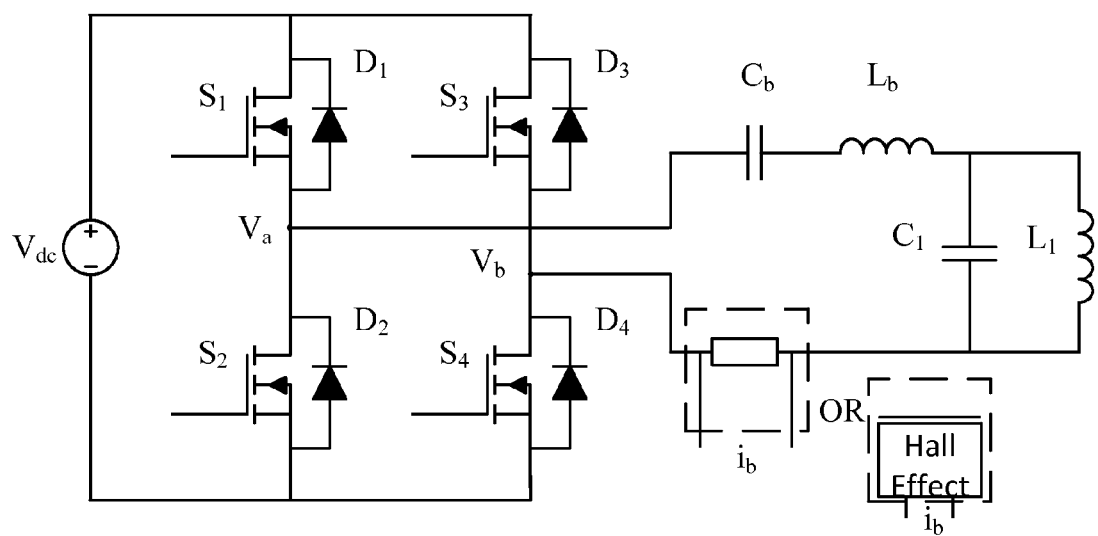
FIG. 26 illustrates bridge inductor current measurement sensing with a resistor or Hall Effect sensor.

Another alternative to measuring the bridge inductor current is to use Hall Effect sensors and power resistors as shown in FIG. 26. Any use of a combination of these sensing circuit topologies is also possible.

Figure 27:
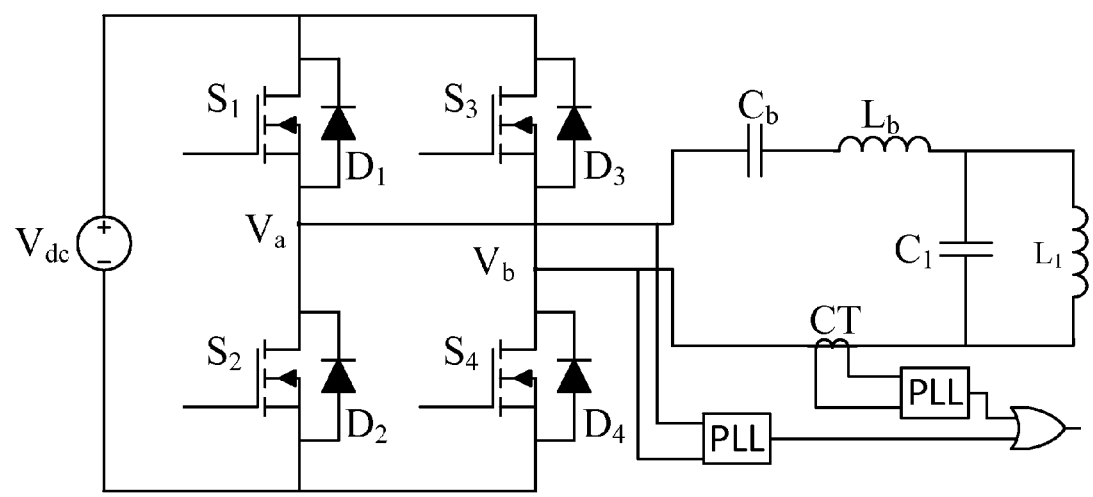
FIG. 27 illustrates an exemplary phase detection circuit using PLL.
Figure 28:
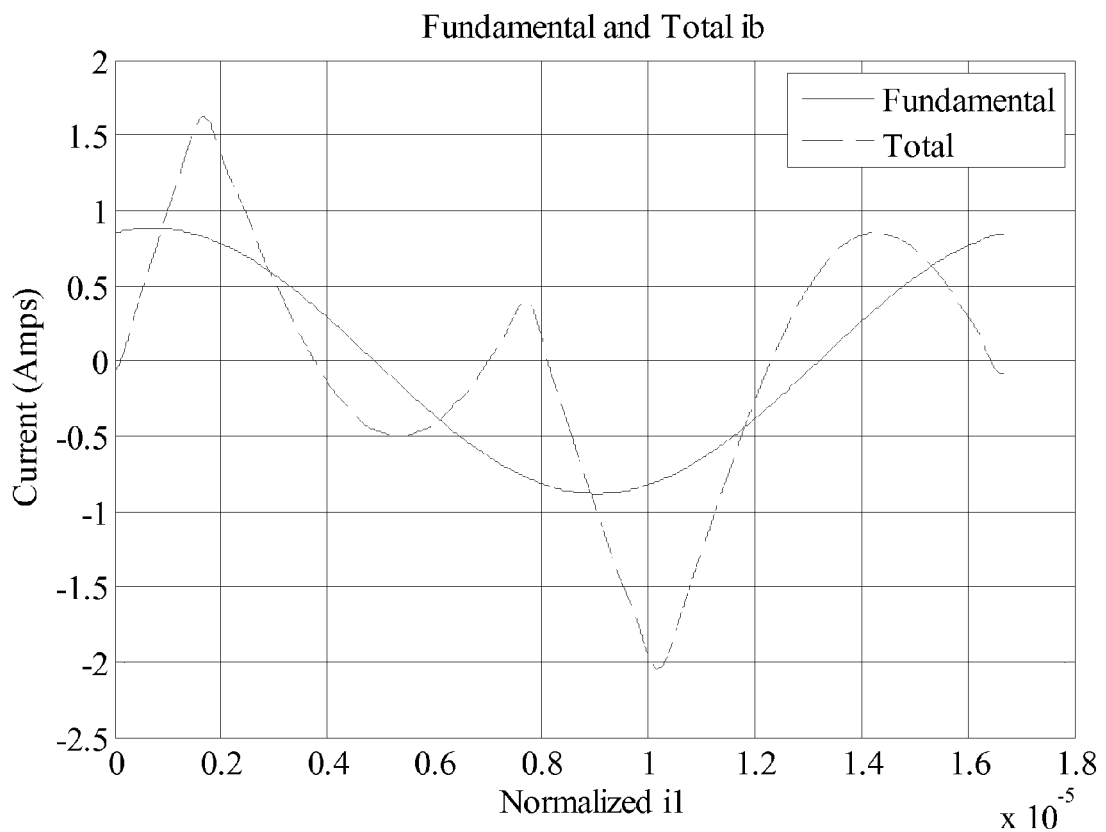
FIG. 28 illustrates an exemplary filtered bridge current waveform.

A more advanced sensing circuit may be used to determine the reflected reactance on the primary track coil. The sensing circuit can be easily obtained by still measuring the bridge inductor current as:

$$i_b = \frac{V_{ab}Z_1}{X_1^2} = \frac{V_{ab}}{X_1^2}(R_{r1} + jX_{r1}) \quad (27)$$

where $X_{r1}$ is the reflected reactance of the secondary pickup. Hence, by measuring the phase of fundamental component of $i_b$ relative to $V_{ab}$, the real and reactive reflected impedances are determined. In addition to the amplitude measurement of $i_b$ outlined previously, a phase measurement circuit is introduced in FIG. 27. A Phase Lock Loop (PLL) circuit may be used to acquire the phase of both $i_b$ and $V_{ab}$ and the difference between the phases is put through an OR gate. $I_b$ and $V_{ab}$ will have 50% duty cycle waveforms and if they are perfectly in phase, referring only a reflected resistance, the OR gate will output 50% duty cycle. For reactive loads, $i_b$ and $V_{ab}$ will not be perfectly in phase, hence the OR output will have greater than 50% output. If $V_{ab}$ leads $i_b$, the $X_{r1}$ must be capacitive, and similarly $X_{r2}$ will be inductive when $i_b$ leads $V_{ab}$. It should be noted that the LCL networks inverts the inductive reflected impedance when measured at the bridge current side. Other circuits such as low pass filters and band pass filters can be added before the PLL to improve the accuracy of phase detection by eliminating the harmonic components. A filtered version of the waveform is shown in FIG. 28. The phase amplitude is determined for the bridge current after filtering and the fundamental amplitude and phase component of $V_{ab}$ are determined using (13) and (14). In addition, other gate level implementations may be used to measure the phase. Moreover, Analog to Digital Conversion (ADC) is used to sample the high frequency waveform and Digital Signal Processors (DSP) is used to measure both the amplitude and phase components in a similar way outlined by the analog circuit counterpart. Furthermore, a combination of any of these circuits in a reasonable manner can also detect and measure both the phase and the amplitude $i_b$, hence estimating the reflected resistance and reactance of the circuit.

Figure 29:
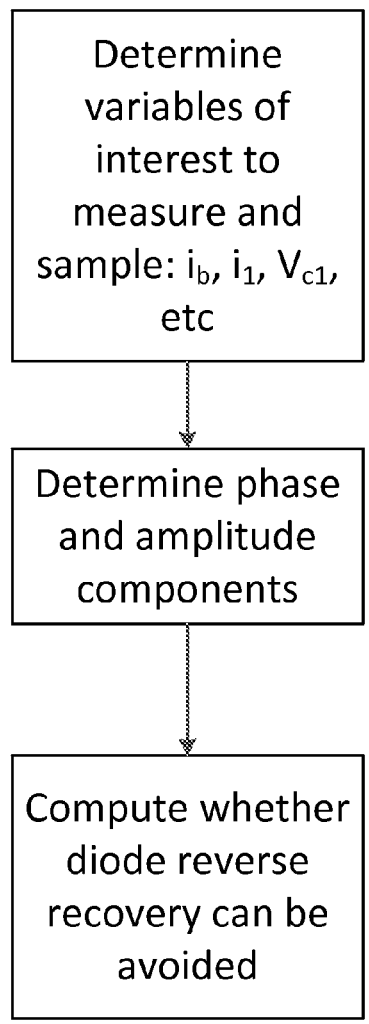
FIG. 29 illustrates a block diagram of an exemplary measuring circuit.

The summary block diagram illustrated in FIG. 29 outlines the operation of the sensor block. Firstly, the key variables of interested are measured or sampled. The amplitude and phase components of these measurements are then obtained, using but not limited to, the methods mentioned above. The amplitude and phase components are then used in the computation to determine whether diode reverse recovery can be achieved.

To maintain low cost in resonant power converters during manufacturing, tuning components with lower tolerances must be used. This adds extra reactive loading on the LCL converter and alters its performance characteristics. To compensate for this, voltage and current sensors outlined above may be used to measure the resonant capacitor voltage and primary track current. However, this may be too costly in mass manufactured systems. Another alternative is to choose the trajectory of control to avoid diode reverse recovery losses for a worst-case tuning mismatch and operate at less optimal THD, switching loss, and conduction loss characteristics during normal operation. The design procedures use both Monte-Carlo analysis and robust system design techniques. The idea behind this analysis is to simulate the LCL resonant network for a wide range of component tolerances (e.g. ±10%). A wide range of computations or simulations should be performed for all combinations of tuning components to help ensure that the worst-case condition in terms of avoiding diode reverse recovery is satisfied with sufficient margin.

6. Controllers for AVC

Figure 30:
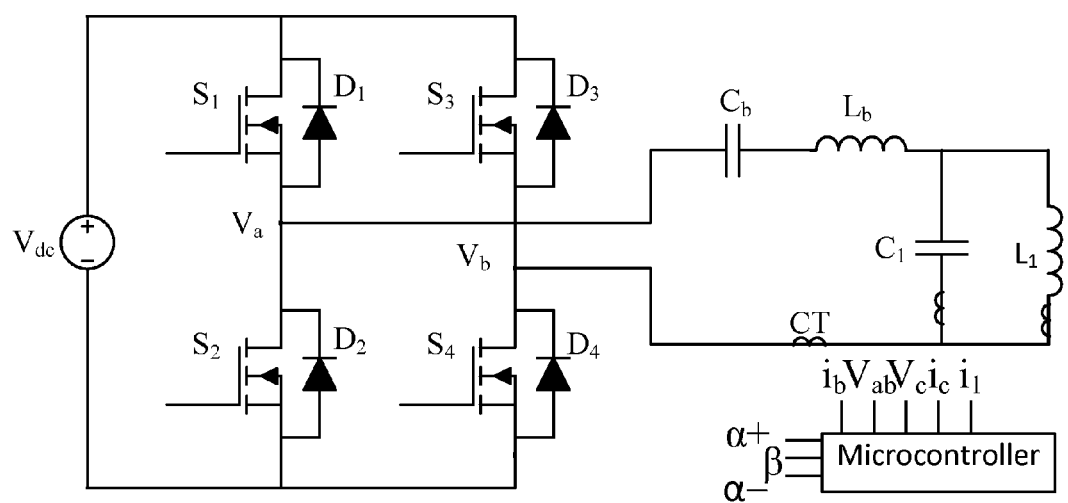
FIG. 30 illustrates an exemplary microcontroller input output signal diagram implementation of controller.
Figure 31:
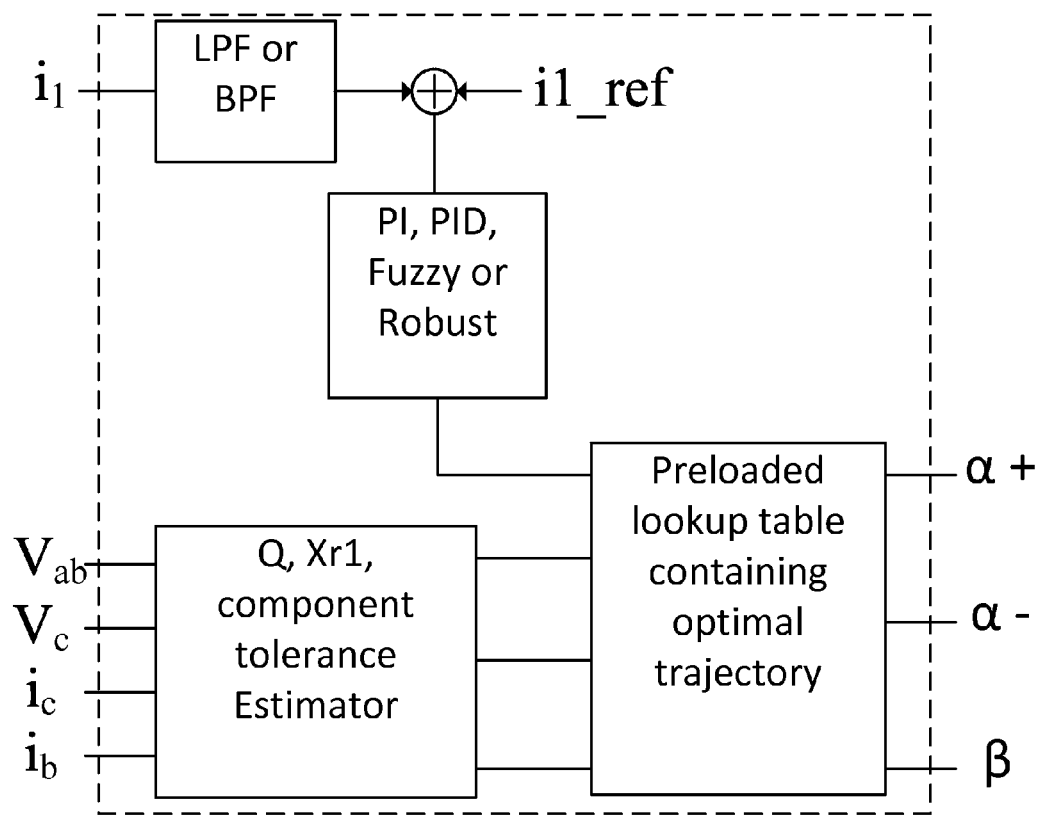
FIG. 31 illustrates an exemplary internal block diagram for a microcontroller implementation of AVC.

To achieve the optimal trajectory during operation, a control system should be practically realized. A primary control variable is the regulation of output current of the LCL converter. After modeling the converter characteristics using system identification or transient analysis techniques, a reduced order transfer function is deduced. Using this transfer function, a closed loop system with a simple Proportional Integral (PI) controller may be implemented as shown in FIG. 30. The controller acquires input from the output current measurement, along with required inputs such as $i_b$, $V_{ab}$, $V_c$, $i_c$, and determines the optimal control angles for the H-bridge via a preloaded lookup table in the microcontroller, as shown in FIG. 31. Other controllers such as Proportional Integral Derivative (PID), fuzzy logic, robust controllers, state space controllers, or others may also be used. In addition, both digital and analog implementations of this control function are possible.

Figure 32:
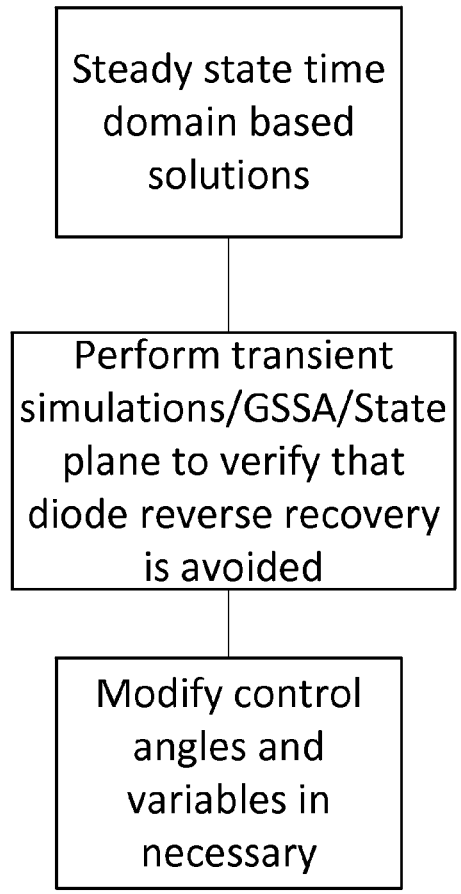
FIG. 32 illustrates an exemplary block diagram for designing an AVC controller.

One of the differences of controlling an LCL converter using AVC instead of other methods is its ability to avoid diode reverse recovery under transient conditions. This is very difficult to guarantee from the steady state solutions computed in the time domain. Hence, additional deterministic operating conditions are incorporated in the controller design to avoid diode reverse recovery. This is because the gain of the system in control angle may have to change under different $Q_1$ and other parameters. As such, nonlinearities may be introduced into the traditional controllers to achieve the required response times. To analytically solve this problem, state-plane analysis and generalized state space averaging (GSSA) may be incorporated in the controller design. A flowchart of a representative design process is shown in FIG. 32. Analysis may be used to verify whether diode reverse can be avoided based on the time domain steady state solutions. If this is not satisfied, two options are available. A first option uses a lower gain in the controller to ramp the track current at very slow speeds so the transient response and steady state is very similar. However, this is not always practical in some applications. Another option is to modify the optimal trajectory by weighting the bridge current at the instance of transition to be larger, so during transient, sufficient margin to avoid reverse recovery losses is still available. This involves changing the weightings in (10).

7. A Soft Switched Fixed Frequency LCL Converter

Figure 33:
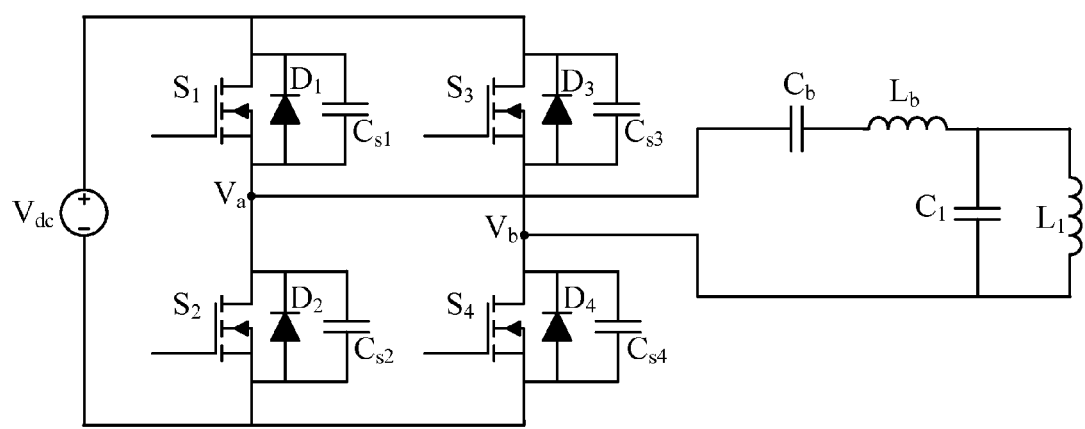
FIG. 33 illustrates an exemplary soft switched fixed frequency LCL converter with extra switch output capacitance.

With the implementation of AVC, diode reverse recovery losses may be completely avoided. As such, the H-bridge in the LCL converter may only have turn-off losses of the power MOSFET's or IGBT's. With this switching characteristic, extra small capacitors or parasitic output capacitances of the power switching devices can aid in the design of a fully soft switched converter achieving Zero Voltage Switching (ZVS) conditions. A typical circuit structure is shown in FIG. 33. The ZVS condition may be achieved by using capacitors to temporarily hold the switch voltage while the current through it decreases to zero during switch turn-off conditions. This enables the voltage transition to be at a minimum during the turn-off condition, hence achieving soft-switched conditions. However, there are some design-constraints to ensure soft switching because the capacitors across the switches must be controlled with care, or a fatal shorting condition of the extra capacitors may occur and cause even higher switching losses or power device failure in extreme conditions. To ensure that the capacitor fully discharges before the switches are turned on, the following equation must be satisfied:

$$C_{sn} = \frac{i_b(0)t_{dead}}{V_{dc}} \qquad (28)$$

Where $t_{dead}$ is the dead time of the H-bridge (i.e. time required prior to changing switching states to avoid shoot-through currents in a branch of the H-bridge), $i_b(0)$ is the bridge inductor current at the switching instant, $V_{dc}$ is the DC input voltage to the H-bridge.

Figure 34:
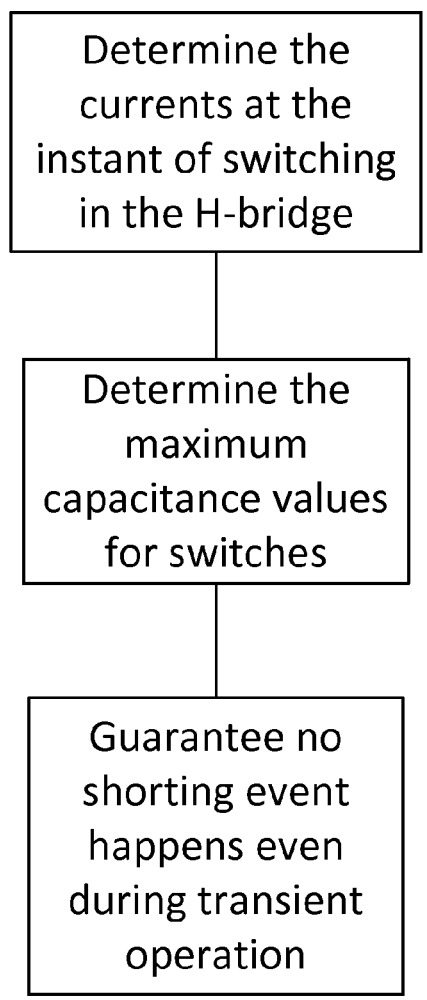
FIG. 34 illustrates an exemplary flowchart for determining switching capacitance values.
Figure 35:
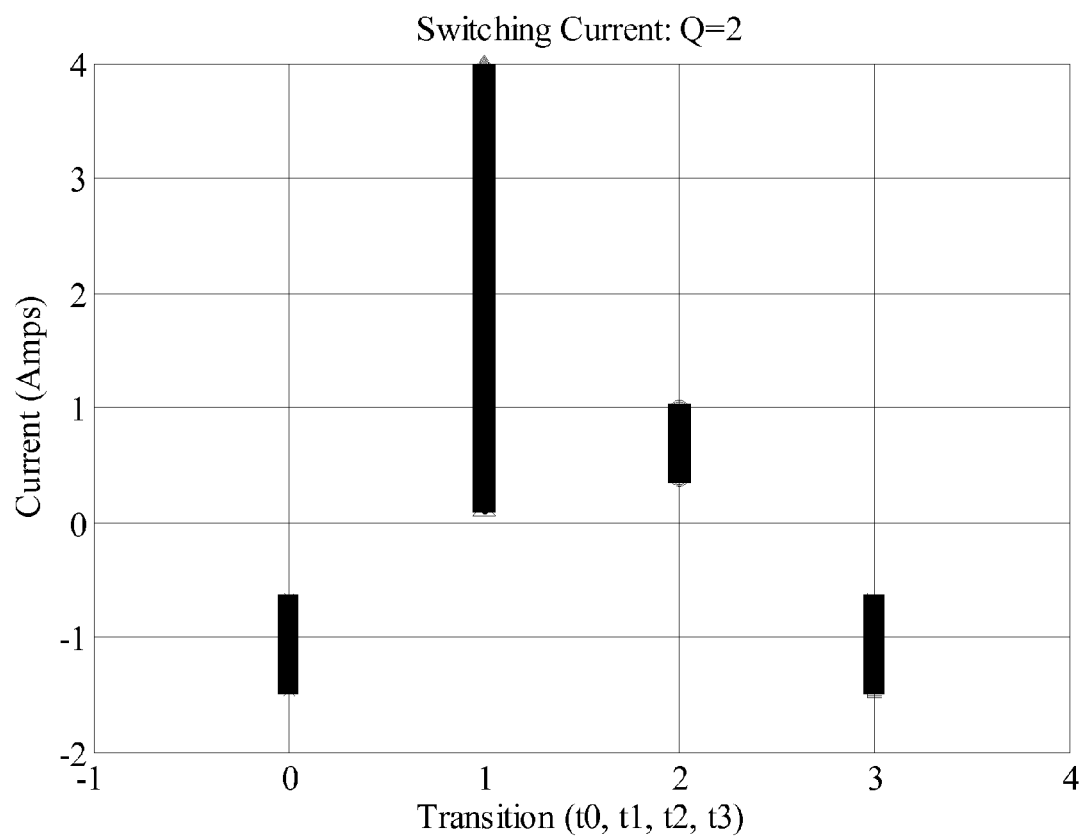
FIG. 35 illustrates various, exemplary bridge currents at the instances of switching.

The parallel capacitor across the switches may not necessarily be the same for the four switches in the H-bridge. This is because the current through the switches is different under the four switching conditions ($S_1$, $S_2$, $S_3$, $S_4$) and hence a different capacitance value is required according to (27). A flowchart shown in FIG. 34 may be used to determine the optimal capacitor values. The first stage in the flowchart is to determine the range of current values at the switching instances. An example of the currents at each of the switching transitions is shown in FIG. 35. These current values are computed from the time domain analysis technique outlined previously. The computation routine in the flowchart should determine the maximum capacitance allowed before a shorting event in the switch appears. Note that the capacitance values in each H-bridge leg are shared for two switching instants. S1 and S3 are grouped together to share one set of capacitor values and S2 and S4 are grouped together to share the other set.

A novel converter for IPT power supplies has been designed to achieve soft switching while keeping the switching frequency constant (LCL converter and AVC). This converter has substantial benefits over traditional converters in IPT where fixed frequency and soft switching cannot be easily realized at the same time. This new control technique has allowed a converter to incorporate both advantages at once.

In some configurations, the systems and methods described herein may be performed by a controller (as described previously, for example). For example, the controller may include a processor and a memory that is in electronic communication with the processor. In some configurations, the memory may store processor executable instructions that cause the processor to enable the systems and methods describe herein. For instance, the processor may execute executable instructions that cause the processor to select an alpha plus (e.g., alpha +), an alpha minus (e.g., alpha −), and a beta that reduces THD and avoids diode reverse recovery loss.

The following examples are illustrative only and are not intended to limit the disclosure in any way.

Examples

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

Figure 37:
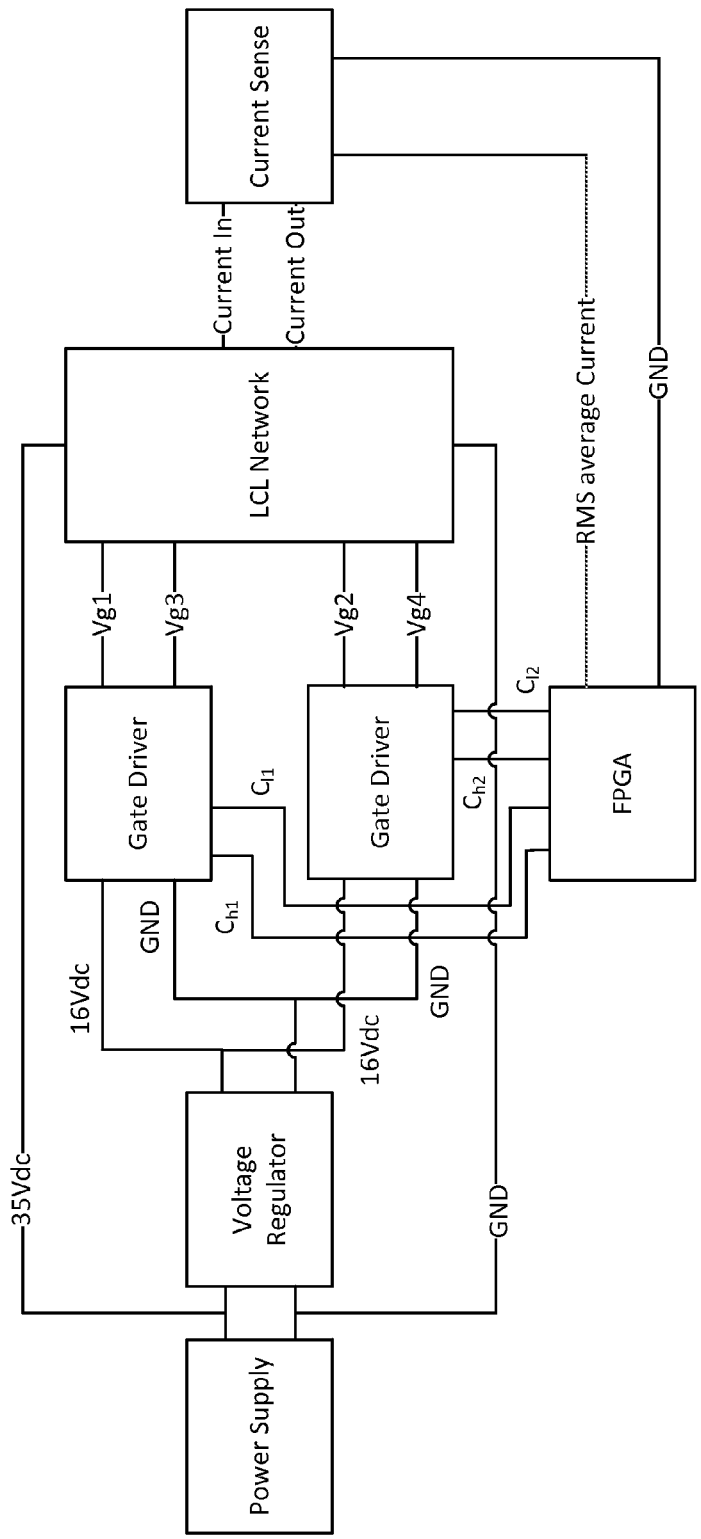
FIG. 37 illustrates an exemplary high-level control block diagram.
Figure 38:
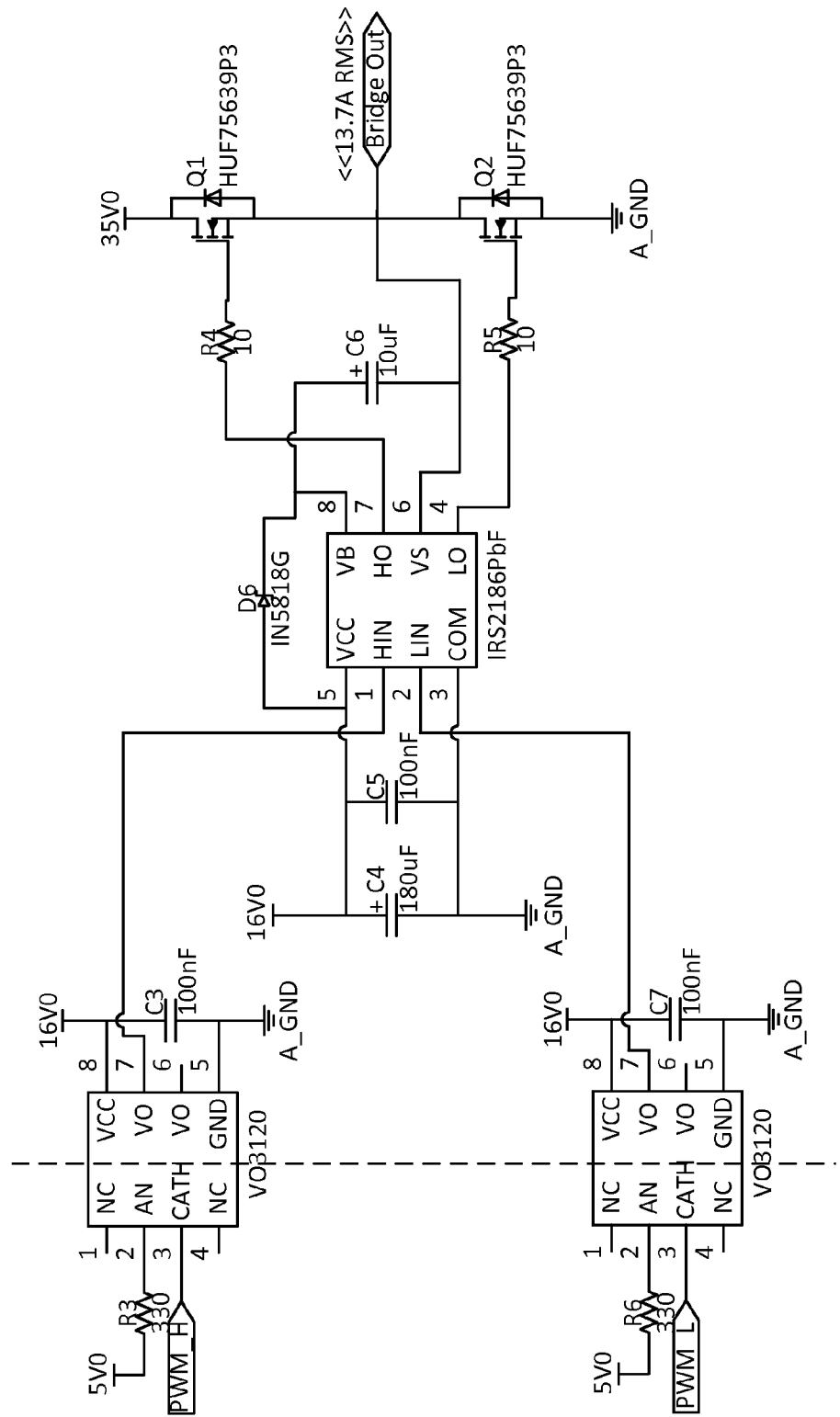
FIG. 38 illustrates a low-level schematic of an exemplary H-bridge half driver.
Figure 39:
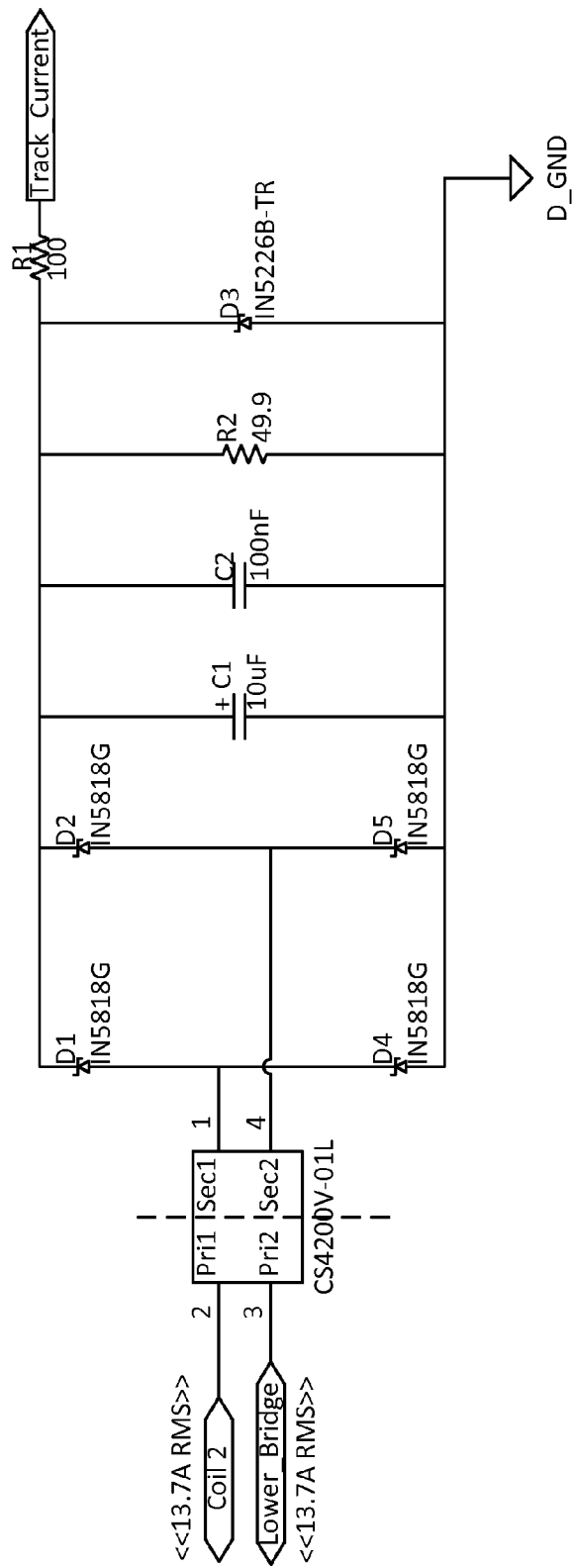
FIG. 39 illustrates an exemplary current path through the disclosed system.

An overall design configuration of one embodiment of the apparatus, which has the parameter values shown in FIG. 36, is illustrated in FIG. 37. FIG. 38 is a schematic of the gate drivers. FIG. 39 illustrates a current path through the disclosed system.

Figure 40:
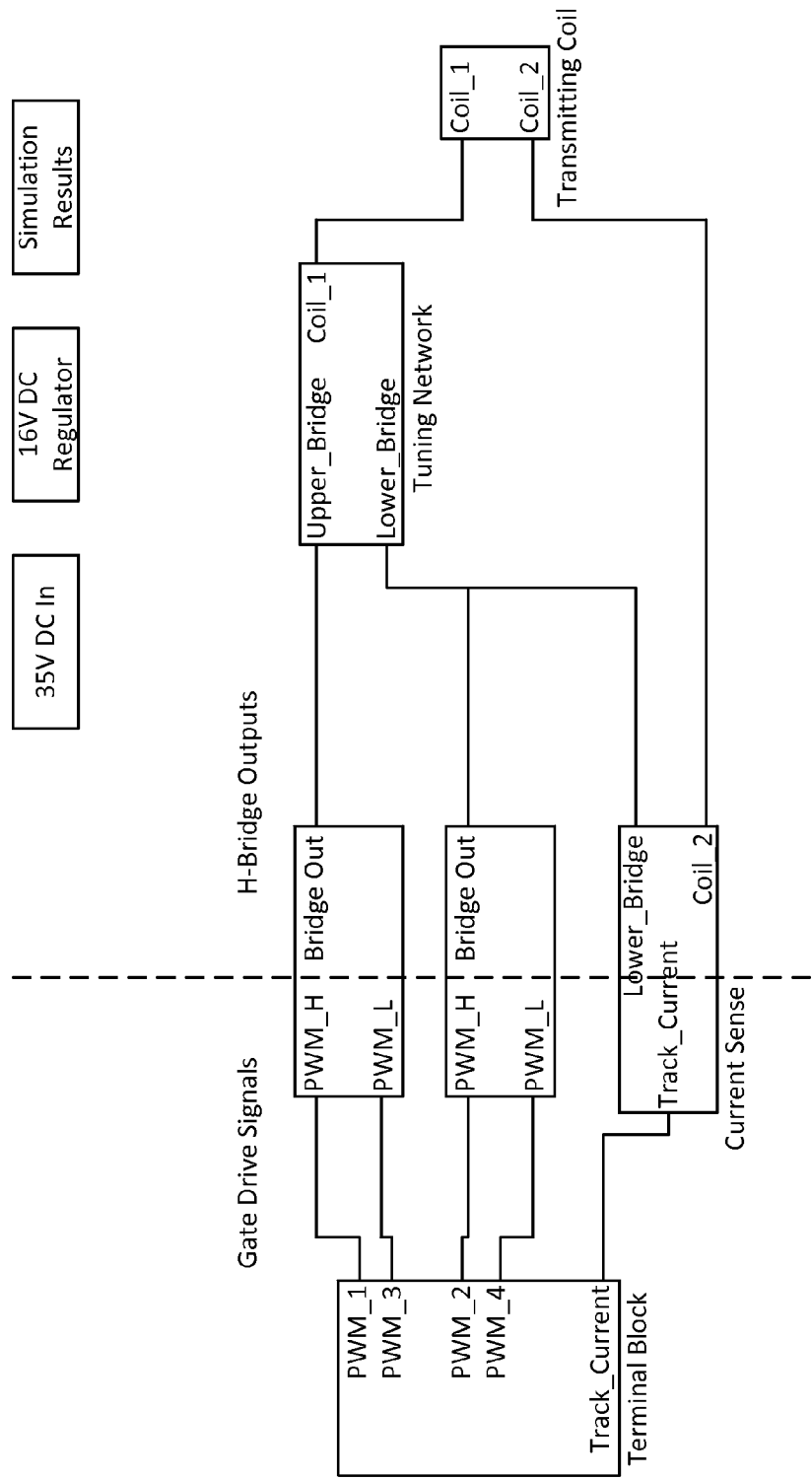
FIG. 40 illustrates a high-level schematic of an exemplary LCL converter system.
Figure 41:
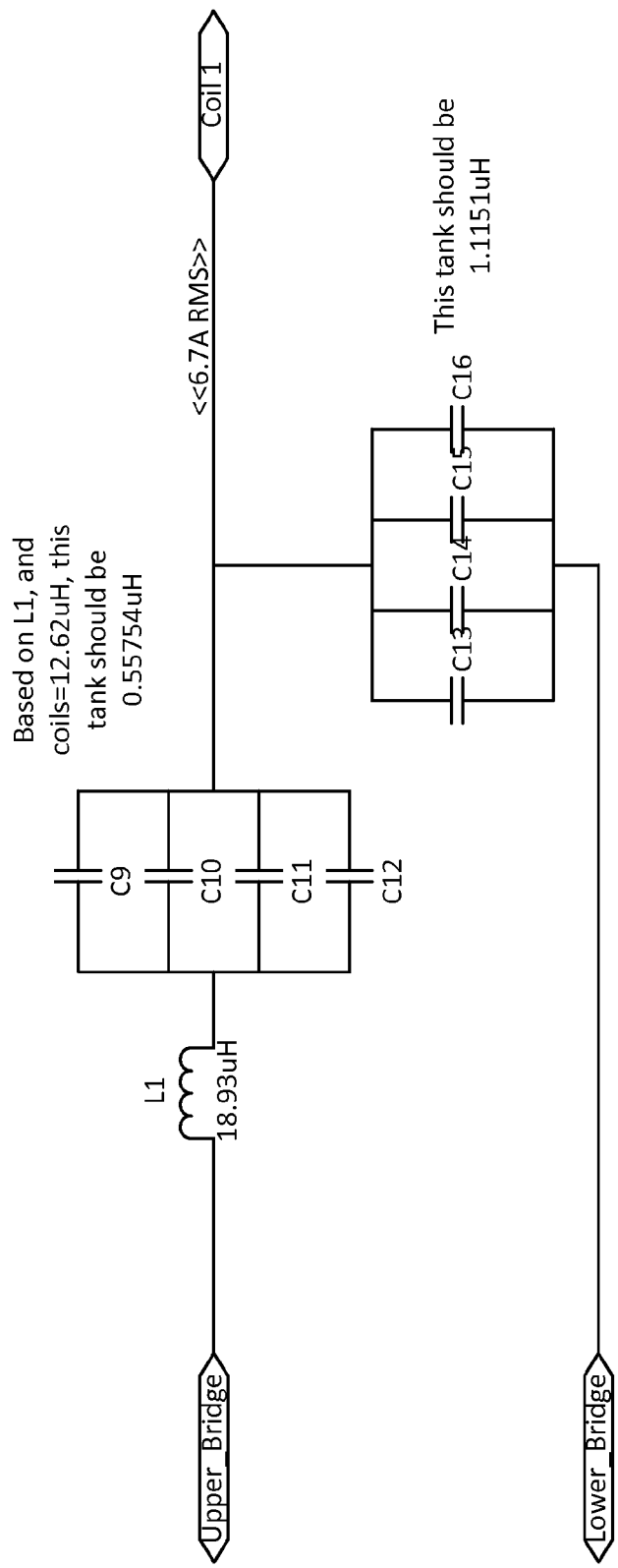
FIG. 41 illustrates a schematic of an exemplary LCL resonant network.

FIG. 40 shows a high level block diagram of one embodiment of the system. The dotted blue line denotes isolation, as the NanoBoard 3000 controller communicates with the rest of the circuit via opto-isolators. FIG. 41 shows a resonant tank of the LCL converter.

Figure 42:
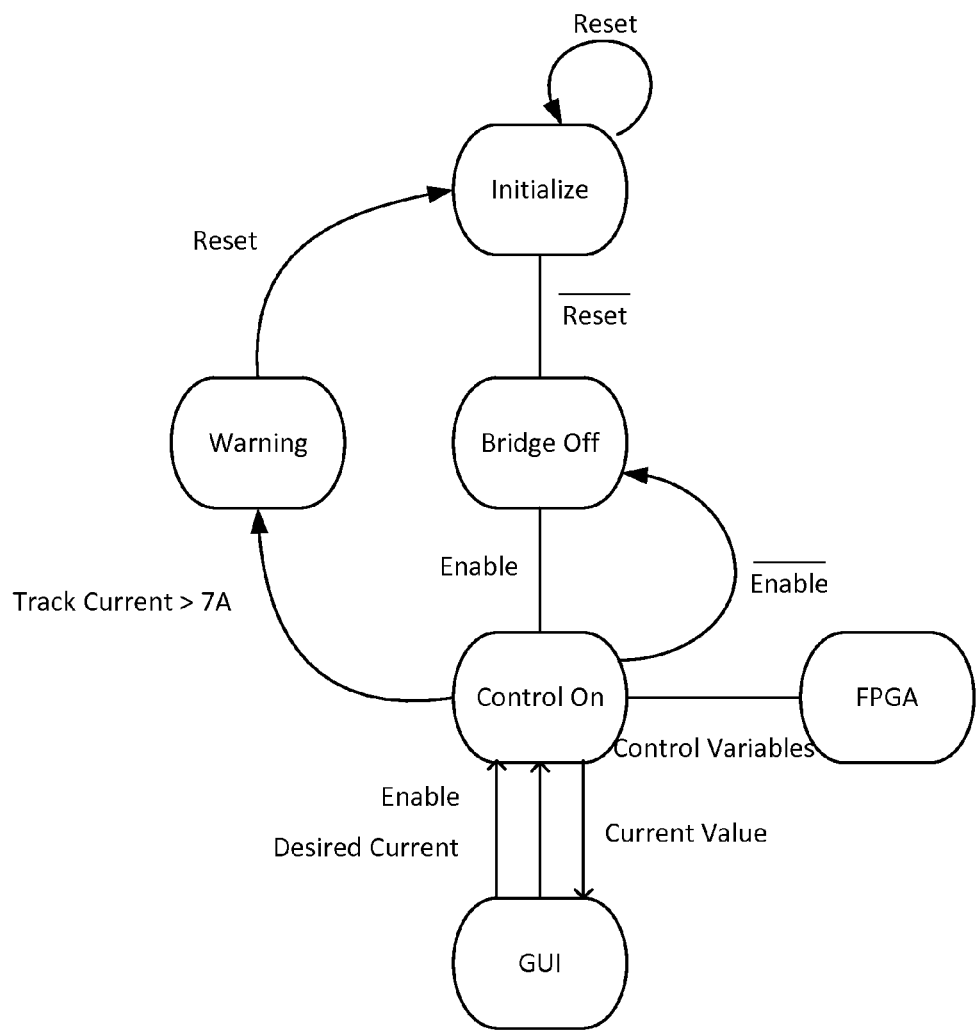
FIG. 42 illustrates an exemplary software flow diagram.
Figure 43:
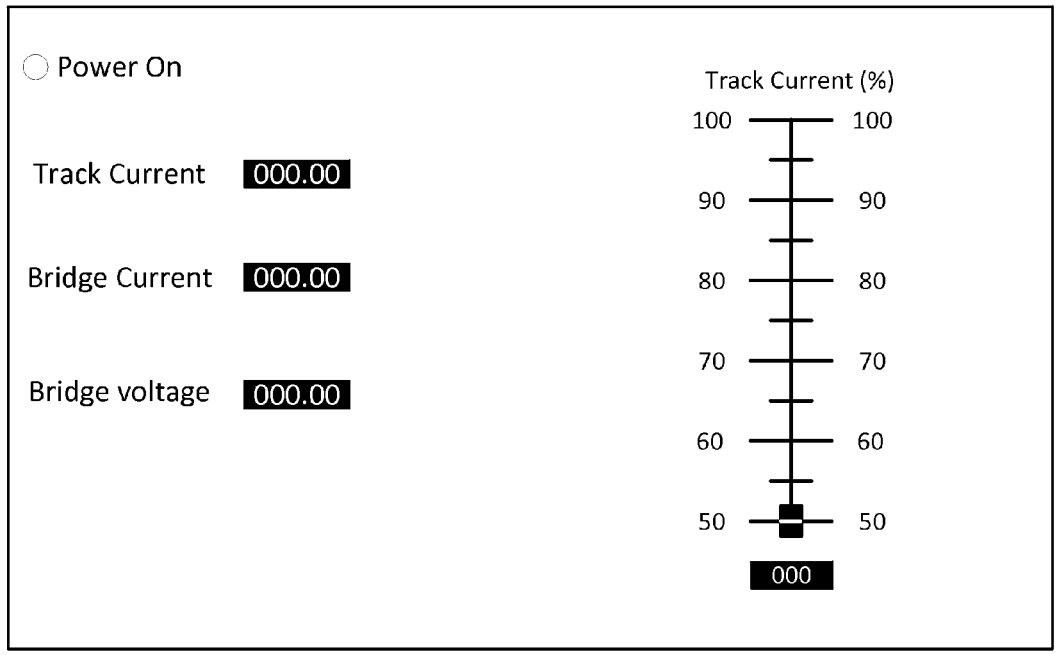
FIG. 43 illustrates an example of an exemplary Graphical User Interface (GUI).

In this embodiment, software provides a user interface for setting the desired current value, overcurrent protection, and control system. These controls are then sent to the firmware that controls the Hardware Description Language (HDL) design in the Field Programmable Gate Array (FPGA) for timing critical gate-level controls. FIG. 42 shows a general outline of the software, and FIG. 43 shows a screen shot of the Graphical User Interface (GUI).

Figure 44:
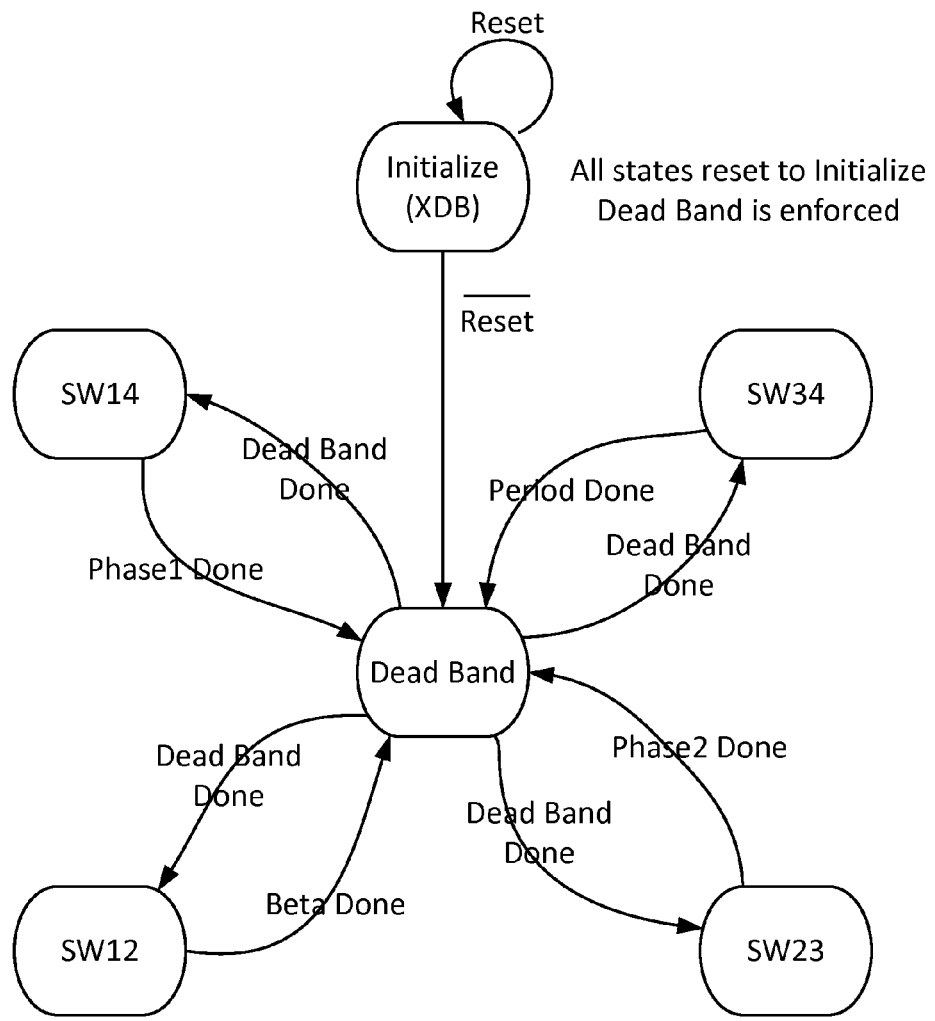
FIG. 44 illustrates a flow diagram of an exemplary Hardware Description Language (HDL) design logic.

In this embodiment, the firmware sets critical timing control for the full bridge through the HDL design interface. The control variables are passed in from the software, checked for validity, and the HDL design interface is used to modify timing. The firmware and HDL design also provide protection for the full bridge as they enforce a dead band on all switching transitions to protect against the high-side and low-side MOSFETs being turned on at the same time. An exemplary flow diagram of the firmware is provided in FIG. 44.

The disclosed AVC method and apparatus may be implemented such that diode reverse recovery loss, as shown in FIGS. 8-10, can be avoided over the same range that ADC control can avoid diode reverse recovery loss. The disclosed AVC method and apparatus also provides THD results that are similar to SVC control.

AVC benefits, in terms of THD, are summarized in FIG. 45, in which the maximum improvement and average improvement in THD over ADC and SVC control methods are shown.

Figure 46:
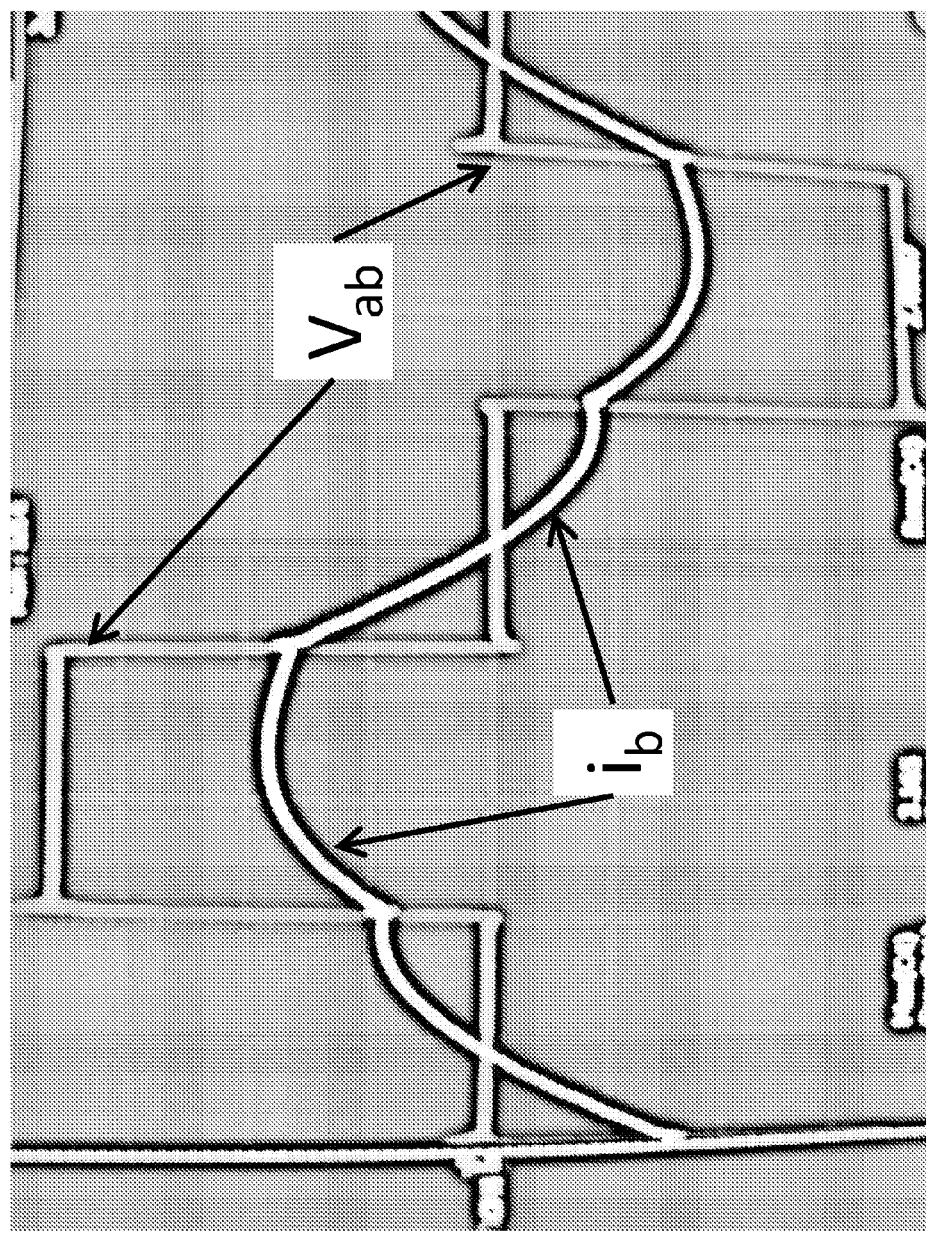
FIG. 46 illustrates exemplary experimental results showing that diode reverse recovery may not be avoided.
Figure 47:
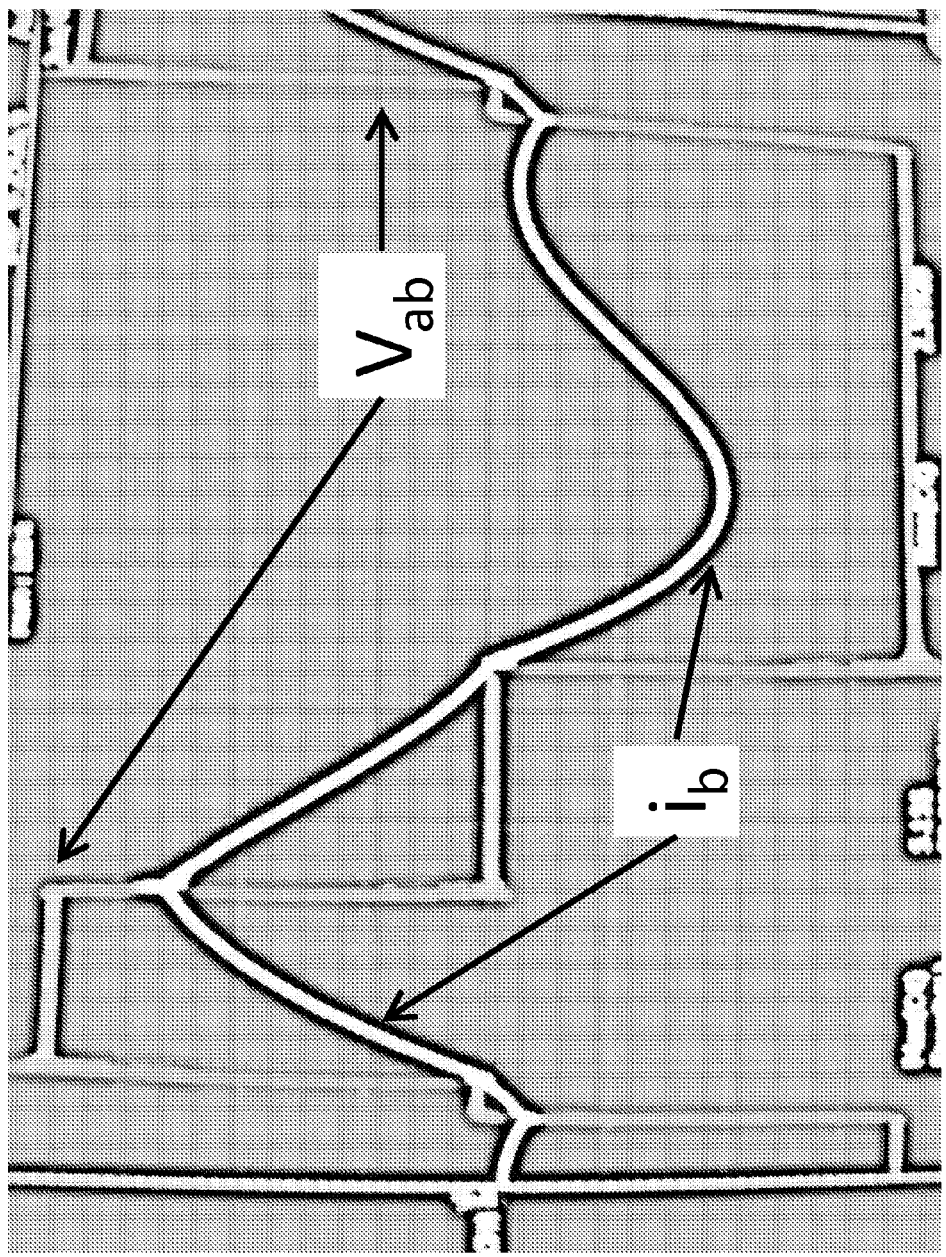
FIG. 47 illustrates exemplary experimental results showing that diode reverse recovery may be avoided.

Test results for an embodiment of the disclosed AVC method and apparatus are presented in FIGS. 46 and 47, which show a comparison between SVC control and AVC control with the same load (Q=2), and the same $i_1$ (4.8 A RMS). In these waveforms the voltage ($V_{ab}$), and the current ($i_b$) are marked. This shows that SVC control does not avoid diode reverse recovery loss and AVC control, when implemented according to an embodiment of the present disclosure, does avoid diode reverse recovery loss. In the SVC waveform example (FIG. 46), the current on the first and third switching transitions is the same sign as the change in voltage (i.e. current is positive, and the voltage is rising). This shows that diode reverse recovery loss is occurring. In comparison, the AVC waveform example (FIG. 47) shows that on all switching transitions the current has the opposite sign as the change in voltage. Hence, diode reverse recovery loss is avoided.

Figure 48:
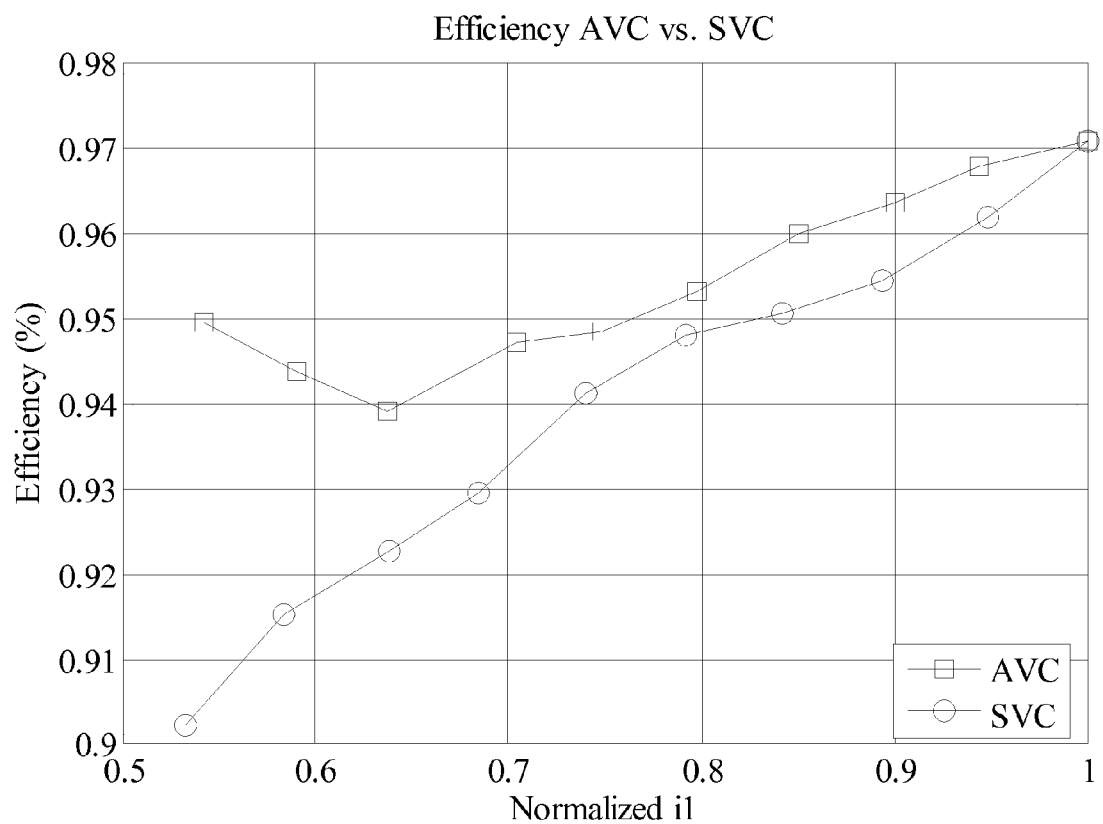
FIG. 48 illustrates an exemplary efficiency comparison of asymmetric voltage cancellation vs. symmetric voltage cancellation.

FIG. 48 shows that AVC control is more efficient. Its efficiency is also more consistent across a wide power range.

Embodiments of the disclosed AVC control in the conditioning circuitry help achieve a highly efficient, non-interfering wireless charging system. This apparatus and method of control is much more complex than the current state of the art SVC control and ADC control schemes and provides the ability to do what SVC control and ADC control systems cannot do on their own. More specifically, AVC control provides the ability to avoid diode reverse recovery loss over a wide range of loading conditions and current values, and achieve acceptable THD.

What is claimed is:

1. A computer-implemented method for controlling a circuit using asymmetric voltage cancellation techniques, comprising:
   determining a plurality of points that avoid diode reverse recovery loss based on a loading condition and at least one circuit parameter, wherein each point comprises a combination of control variables;

determining a harmonic distortion for each of the plurality of points;

determining a trajectory of points with a minimized harmonic distortion based on the determined harmonic distortion;

controlling the circuit using the combination of control variables for at least one point on the trajectory of points; and controlling a power level in the circuit based on the loading condition.

2. The method of claim 1, wherein the combination of control variables comprises:

an alpha plus control variable;

an alpha minus control variable; and a beta control variable, wherein the alpha plus control variable, the alpha minus control variable, and the beta control variable enable asymmetric voltage cancellation.

3. The method of claim 1, wherein the circuit comprises:

a first inductor;

a capacitor; and a second inductor, wherein the first inductor, the capacitor, and the second inductor are configured to form an Inductor Capacitor Inductor (LCL) converter.

4. The method of claim 3, wherein the at least one circuit parameter comprises at least one of:

a ratio of a first inductance to a second inductance, wherein the first inductance is based on the first inductor and the second inductance is based on the second inductor;

an impedance;

a reflected impedance; and a component tolerance.

5. The method of claim 1, further comprising:

monitoring the loading condition of the circuit; and adjusting the combination of control variables based on the loading condition.

6. The method of claim 1, further comprising:

monitoring the at least one circuit parameter of the circuit; and adjusting the combination of control variables along the trajectory of points based on the sensed circuit parameter.

7. The method of claim 1, wherein the combination of control variables for the at least one point on the trajectory of points enables soft switching at a constant switching frequency.

8. A controller configured to reduce diode reverse recovery losses of a circuit, comprising:

a processor;

a memory in electronic communication with the processor, wherein the memory stores executable instructions that when executed by the processor cause the processor to perform the steps of:

determining a plurality of points that avoid diode reverse recovery loss based on a loading condition and at least one circuit parameter, wherein each point comprises a combination of control variables;

determining a harmonic distortion for each of the plurality of points;

determining a trajectory of points with a minimized harmonic distortion based on the determined harmonic distortion;

controlling the circuit using the combination of control variables for at least one point on the trajectory of points; and controlling a power level in the circuit based on the loading condition.

9. The controller of claim 8, wherein the combination of control variables comprises:

an alpha plus control variable;

an alpha minus control variable; and a beta control variable, wherein the alpha plus control variable, the alpha minus control variable, and the beta control variable enable asymmetric voltage cancellation.

10. The controller of claim 8, wherein the circuit comprises:

a first inductor;

a capacitor; and a second inductor, wherein the first inductor, the capacitor, and the second inductor are configured to form an Inductor Capacitor Inductor (LCL) converter.

11. The controller of claim 10, wherein the at least one circuit parameter comprises at least one of:

a ratio of a first inductance to a second inductance, wherein the first inductance is based on the first inductor and the second inductance is based on the second inductor;

an impedance;

a reflected impedance; and a component tolerance.

12. The controller of claim 8, further comprising:

monitoring the loading condition of the circuit; and adjusting the combination of control variables based on the loading condition.

13. The controller of claim 8, further comprising:

monitoring the at least one circuit parameter of the circuit; and adjusting the combination of control variables along the trajectory of points based on the sensed circuit parameter.

14. The controller of claim 8, wherein the combination of control variables for the at least one point on the trajectory of points enables soft switching at a constant switching frequency.

15. An inductive power transfer system, comprising:

a resonant converter circuit having a transmitter coil;

a receiver coil configured to receive power from the transmitter coil; and a controller, wherein the controller comprises a processor to perform the steps of:

determining a plurality of points that avoid diode reverse recovery loss for the resonant converter based on a loading condition and at least one circuit parameter of the resonant converter circuit, wherein each point comprises a combination of control variables;

determining a harmonic distortion for each of the plurality of points;

determining a trajectory of points with a minimized harmonic distortion based on the determined harmonic distortion;

controlling the resonant converter circuit using the combination of control variables for at least one point on the trajectory of points; and controlling a power level in the resonant converter circuit based on the loading condition.

16. The inductive power transfer system of claim 15, wherein the combination of control variables comprises:

an alpha plus control variable;

an alpha minus control variable; and a beta control variable, wherein the alpha plus control variable, the alpha minus control variable, and the beta control variable enable asymmetric voltage cancellation.

17. The inductive power transfer system of claim 15, wherein the resonant converter circuit comprises:
- a diode;
- a first inductor;
- a capacitor; and
- a second inductor, wherein the first inductor, the capacitor, and the second inductor are configured to form an Inductor Capacitor Inductor (LCL) converter.

18. The inductive power transfer system of claim 17, wherein the circuit parameter comprises at least one of:
- a ratio of a first inductance to a second inductance, wherein the first inductance is based on the first inductor and the second inductance is based on the second inductor;
- a reflected impedance; and
- a component tolerance.

19. The inductive power transfer system of claim 15, wherein the processor further performs the steps of:
- monitoring the loading condition of the circuit;
- adjusting the combination of control variables based on the loading condition;
- monitoring the at least one circuit parameter of the circuit; and
- adjusting the combination of control variables along the trajectory of points based on the circuit parameter.

20. The inductive power transfer system of claim 15, wherein the combination of control variables for the point on the trajectory of points enables soft switching at a constant switching frequency of the resonant converter circuit.

* * * * *